US008578593B2

(12) United States Patent
Tanaka et al.

(10) Patent No.: US 8,578,593 B2
(45) Date of Patent: Nov. 12, 2013

(54) METHOD OF MANUFACTURING THERMAL ASSISTED MAGNETIC WRITE HEAD

(75) Inventors: Kosuke Tanaka, Tokyo (JP); Shinji Hara, Tokyo (JP); Tsutomu Chou, Tokyo (JP); Yasutoshi Fujita, Hong Kong (CN)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 521 days.

(21) Appl. No.: 12/902,755

(22) Filed: Oct. 12, 2010

(65) Prior Publication Data
US 2012/0084969 A1 Apr. 12, 2012

(51) Int. Cl.
*G11B 5/187* (2006.01)
*G11B 7/08* (2006.01)

(52) U.S. Cl.
USPC .......... 29/603.12; 29/603.15; 29/603.16; 29/603.18; 369/13.17; 369/13.35; 369/112.27

(58) Field of Classification Search
USPC .......... 29/603.07, 603.11, 603.12, 603.15, 29/603.16, 603.18, 603.2; 369/13.17, 369/13.35, 13.38, 112.27
See application file for complete search history.

(56) References Cited

U.S. PATENT DOCUMENTS

| 5,083,365 A * | 1/1992 | Matsumoto .......... 29/603.12 |
| 6,649,894 B2 | 11/2003 | Matsumoto et al. |
| 6,768,556 B1 | 7/2004 | Matsumoto et al. |
| 7,454,095 B2 | 11/2008 | Baehr-Jones et al. |
| 7,464,457 B2 * | 12/2008 | Le et al. .......... 29/603.16 |
| 2007/0139818 A1 | 6/2007 | Shimazawa et al. |
| 2009/0073597 A1 | 3/2009 | Shiramatsu et al. |
| 2009/0168220 A1 | 7/2009 | Komura et al. |

FOREIGN PATENT DOCUMENTS

| JP | A-2001-216673 | 8/2001 |
| JP | A-2001-283403 | 10/2001 |
| JP | 2007095167 A * | 4/2007 |
| JP | A-2009-59417 | 3/2009 |

OTHER PUBLICATIONS

U.S. Appl. No. 12/710,129, filed Feb. 22, 2010, in the name of Tsutomu Chou et al.
U.S. Appl. No. 12/557,078, filed Sep. 10, 2009, in the name of Daisuke Miyauchi et al.

* cited by examiner

*Primary Examiner* — A. Dexter Tugbang
(74) *Attorney, Agent, or Firm* — Oliff & Berridge, PLC

(57) ABSTRACT

A method of manufacturing a thermally-assisted magnetic write head is provided. The method includes steps of: forming a laminate structure including the waveguide; the plasmon generator, and the magnetic pole in order; performing a first polishing process to planarize an end surface of the laminate structure; performing a first etching process to remove impurity attached on the end surface of the laminate structure, and to allow the plasmon generator to be recessed from the waveguide and the magnetic pole, thereby forming a recessed region on the end surface of the laminate structure; forming a protection layer on the end surface of the laminate structure such that at least the recessed region is filled; and performing a second polishing process on the end surface of the laminate structure formed with the protection layer until the plasmon generator is exposed, thereby completing the air bearing surface.

7 Claims, 19 Drawing Sheets

METHOD OF MANUFACTURING THERMAL ASSISTED MAGNETIC WRITE HEAD

BACKGROUND OF THE INVENTION

1. Field of the Invention

The present invention relates to a manufacturing method of a thermally-assisted magnetic write head for use of thermally-assisted magnetic writing with which writing of information is performed by reducing the coercive force of a magnetic recording medium through irradiation of a near-field light.

2. Description of the Related Art

A magnetic disk device has been previously used for recording and reading of magnetic information (hereinafter, simply referred to as information). The magnetic disk device is the one provided with a magnetic disk and a magnetic write/read head inside of a chassis, for example. The magnetic disk stores therein information, and the magnetic write/read head performs recording of information to this magnetic disk, and performs reproduction of the information recorded on the magnetic disk. The magnetic disk is supported by the rotation shaft of a spindle motor that is fixed to the chassis, and is so configured as to rotate thereabout. On the other hand, the magnetic write/read head is formed to one side surface of a magnetic head slider that is disposed at one end of a suspension, and is so configured as to include a magnetic recording element and a magnetic read element that are each provided with an air bearing surface (ABS; Air Bearing Surface) opposing the magnetic disk. Especially, as the magnetic read element, an MR element producing the magnetoresistive (MR: Magnetoresistive) effects is generally used. The remaining end of the suspension is attached to the tip end of an arm that is supported to the fixed shaft to be able to pivot thereabout. The fixed shaft is the one disposed upright in the chassis.

When the magnetic disk device is in the resting state, that is, when the magnetic disk is not moving with no rotation, the magnetic write/read head does not exist on the magnetic disk, and is in the state of being out of the way toward the outside (in the state of unloading). In such a state, when the magnetic disk device is put in the driving state, and when the magnetic disk starts rotating, the magnetic write/read head is put in the state of being moved to a predetermined position on the magnetic disk together with the suspension (in the loaded state). When the rotation of the magnetic disk reaches any predetermined rotation speed, the balance between the positive pressure and the negative pressure makes the magnetic head slider suspended with a good stability with a slight distance from the surface of the magnetic disk so that the recording and reproduction of information may be performed with a good accuracy.

In recent years, a magnetic disk has been increased in recording density (increased in capacity), and in response thereto, there has been a demand for the better performance capabilities of a magnetic write/read head and those of the magnetic disk. The magnetic disk is a non-contiguous medium being a cluster of magnetic particles, and the magnetic particles are each in the single-domain structure. In such a magnetic disk, one recording bit is configured by a plurality of magnetic particles. These magnetic particles are required to be smaller in size because, for the purpose of increasing the recording density, the border between any two recording bits adjacent to each other has to be less bumpy. However, if the magnetic particles are reduced in size as such, the resulting decrease of volume of the magnetic particles causes a problem of reducing the thermal stability in terms of magnetization of the magnetic particles. In order to solve such a problem, increasing the anisotropic energy of the magnetic particles produces good effects. The concern here is that, however, if the anisotropic energy of the magnetic particles is increased as such, the magnetic disk is resultantly increased in coercive force, thereby causing a problem of difficulty in information recording for any existing magnetic head.

As a method for solving such problems as described above, a method of so-called thermally-assisted magnetic writing has been proposed. This method uses a magnetic recording medium with a higher degree of coercive force, and during recording of information, a portion of the magnetic recording medium for recording of information is heated at the same time as the application of a magnetic field. As such, the portion is increased in temperature but is reduced in coercive force, thereby performing the recording of information. Hereinafter, the magnetic head for use with the thermally-assisted magnetic writing as such is referred to as thermally-assisted magnetic write head. Note here that as to the thermally-assisted magnetic write head, the one in Specification of United States Patent Application No. 2007/139818 or the one in Specification of United States Patent Application No. 2009/168220 is known.

With such thermally-assisted magnetic writing, as a method for applying heat to a magnetic recording medium, a method of using a near-field light is generally used. As a method of generating such a near-field light, a generally known method is to use a near-field light probe, i.e., so-called plasmon generator. The near-field light probe is a metal piece that generates a near-field light from plasmons excited by a light. The concern here is that, however, a material mainly including Au (gold), Ag (silver), Cu (copper), Al (aluminum), or others those considered each as a preferable material to configure the plasmon generator that generates a near-field light through irradiation of a light has the characteristics of being easily removed by a process of etching (ion beam etching or others) that is generally executed for the purpose of removing any impurities during the formation of an air bearing surface. Therefore, in the air bearing surface, the end surface of the plasmon generator shows a tendency to be in the state of being positioned in the rear of the end surface of a magnetic pole, that of a waveguide, or that of a shield layer, for example. Accordingly, with the thermally-assisted magnetic write head in such a state, during the operation thereof, the near-field light may not be enough in intensity, or the write head may not be stable enough while it is in the state of being suspended, and this is considered not desirable in view of reliability.

In consideration thereof, the air bearing surface is expected to be better in flatness, and the operation capabilities are expected to be provided with a better stability.

SUMMARY OF THE INVENTION

A method of manufacturing a thermally-assisted magnetic write head as an aspect of the invention is a method of manufacturing a thermally-assisted magnetic write head that includes a magnetic pole including an end surface exposed from an air bearing surface, a waveguide that extends toward the air bearing surface for transmission of a light, and a plasmon generator provided between the magnetic pole and the waveguide for generating a near-field light from the air bearing surface based on the light transmitted over the waveguide, and the method includes the following steps of (A) to (E).

(A) Step of forming a laminate structure including the waveguide, the plasmon generator, and the magnetic pole.

(B) Step of performing a first polishing process to planarize an end surface of the laminate structure.

(C) Step of forming a recessed region on the end surface of the laminate structure by a first etching process of removing any impurities attached on the end surface of the laminate structure, and allowing the plasmon generator to be recessed from the waveguide and the magnetic pole.

(D) Step of forming a protection layer on the end surface of the laminate structure to fill at least the recessed region.

(E) Step of forming the air bearing surface by starting a second polishing process on the end surface of the laminate structure formed with the protection layer, and by stopping the second polishing process before the plasmon generator is exposed therefrom.

With the manufacturing method of the thermally-assisted magnetic write head in the aspect of the invention, by the first etching process, the concave portion is formed by moving the plasmon generator on the end surface of the laminate structure to be in the rear of the waveguide and the magnetic pole, and by forming the protection layer to fill at least the concave portion so that the resulting air bearing surface may be flat. Accordingly, during the recording operation, the resulting near-field light may be of sufficient intensity, and the slider may be suspended with a better stability. As a result, the recording operation may be implemented with a better efficiency and a better stability.

DETAILED DESCRIPTION OF THE PREFERRED EMBODIMENT

In the below, an embodiment of the invention is described in detail by referring to the accompanying drawings.
(Configuration of Magnetic Disk Device)

First of all, by referring to FIGS. 1 and 2, the configuration of a magnetic disk device as an embodiment of the invention is described below.

Figure 1:
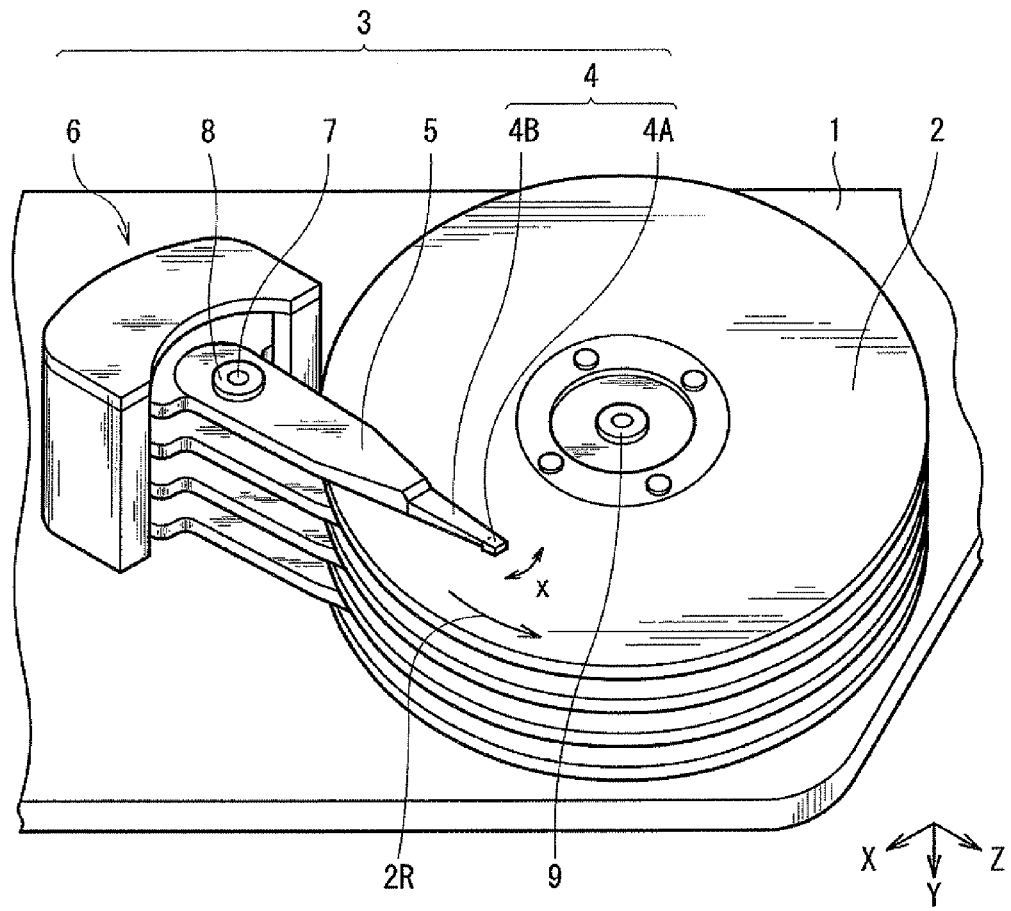
FIG. 1 is a perspective view of a magnetic disk device provided with a magnetic write/read head as an embodiment of the invention, showing the configuration thereof.

FIG. 1 is a perspective view of the magnetic disk device in the embodiment, showing the internal configuration thereof. This magnetic disk device is in the mode of load/unload adopted for a driving mode, and is configured to include a magnetic disk 2, and a head arm assembly (HAA) 3 inside of a chassis 1, for example. The magnetic disk 2 serves as a magnetic recording medium for use of recording of information thereto, and the head arm assembly 3 is for performing the recording of information to the magnetic disk 2, and for read the recorded information. The HAA 3 is provided with a head gimbals assembly (HGA) 4, an arm 5 for supporting the base portion of this HGA 4, and a drive section 6 serving as a power source for pivoting the arm 5. The HGA 4 is the one provided with a magnetic head slider (hereinafter, simply referred to as "slider") 4A, and a suspension 4B. The magnetic head slider 4A is provided with, on one side surface, the magnetic write/read head (will be referred to later) of this embodiment, and the suspension 4B is attached with this slider 4A at one end. As to this suspension 4B, the remaining end (end portion on the side opposite to the slider 4A) is supported by the arm 5. The arm 5 is so configured as to be able to pivot about the center shaft being a fixed shaft 7 fixed to the chassis 1 via a bearing 8. The drive section 6 is exemplified by a voice coil motor or others. Note that the magnetic disk device is provided with a plurality of (four in FIG. 1) magnetic disks 2, and the recording surface (topside and underside) of each of the magnetic disks 2 is provided with the slider 4A. These sliders 4A are each allowed to move, in the plane parallel to the recording surface of the corresponding magnetic disk 2, in the direction of crossing over the recording tracks, that is, in the track-width direction (X-axis direction). On the other hand, the magnetic disks 2 are each so configured as to rotate about a spindle motor 9 fixed to the chassis 1 in a rotation direction 2R, which is almost orthogonal to the X-axis direction. By the rotation of the magnetic disk 2, and by the movement of the corresponding slider 4A, the magnetic disk 2 is to be recorded with information, or any recorded information is read therefrom. Moreover, this magnetic disk device is provided with a control circuit (will be described later) that controls the writing operation and the read operation of a magnetic write/read head 10, and controls the light-emission operation of a laser diode being a light source that generates a laser light for the thermally-assisted magnetic writing that will be described later.

Figure 2:
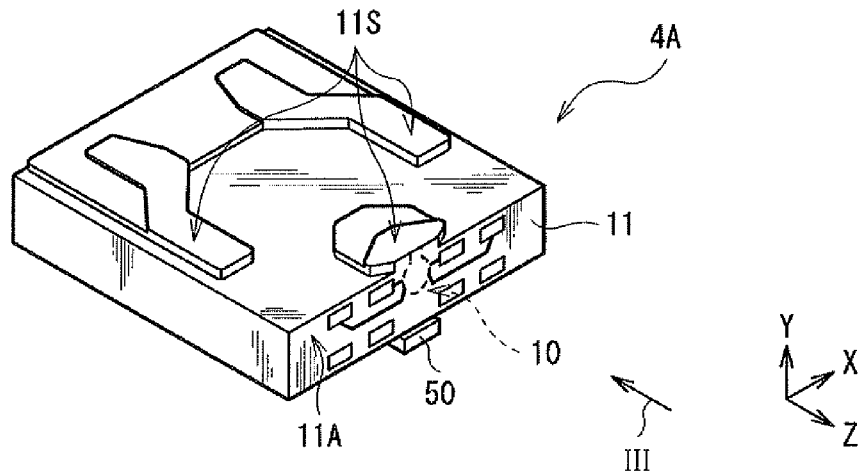
FIG. 2 is a perspective view of a slider in the magnetic disk device of FIG. 1, showing the configuration thereof.

FIG. 2 shows the configuration of the slider 4A of FIG. 1. This slider 4A has a base 11 in the shape of a block made of $Al_2O_3$.TiC (AlTiC), for example. This base 11 is formed substantially in the shape of a hexahedron, and one surface thereof is an ABS 11S that is so disposed as to oppose, in proximity to, the recording surface of the magnetic disk 2. When the magnetic disk device is not driven, that is, when the spindle motor 9 is not in motion, and when none of the magnetic disks 2 is in rotation, all of the sliders 4A are in the state of being out of the way from above the magnetic disks 2 (in the state of unloading) in order to prevent any contact between the ABS 11S and the recording surfaces. On the other hand, at the time of startup, the magnetic disks 2 start rotating at a high speed by the spindle motor 9, and the arm 5 is pivoted about the center shaft being the fixed shaft 7 by the drive section 6. This moves each of the sliders 4A onto the topside of the corresponding magnetic disk 2 so that the sliders 4A are put in the state of loading. Such a high-speed rotation of the magnetic disks 2 generates airflow between the recording surfaces and the ABS 11S, and by the lift resulted therefrom, the sliders 4A are put in the state of being suspended so as to keep a predetermined spacing (magnetic spacing) MS (FIG. 5 that will be referred to later) along the direction in which the sliders 4A are orthogonal to the recording surfaces (Y-axis direction). Moreover, an element forming surface 11A being a side surface orthogonal to the ABS 11S is provided with the magnetic write/read head 10. Note that a surface 11B on the opposite side to the ABS 11S in the base 11 is provided with a light source unit 50 in close vicinity of the magnetic write/read head 10.

(Detailed Configuration of Magnetic Write/Read Head)

Next, by referring to FIGS. 3 to 6, the magnetic write/read head 10 is described in more detail.

Figure 3:
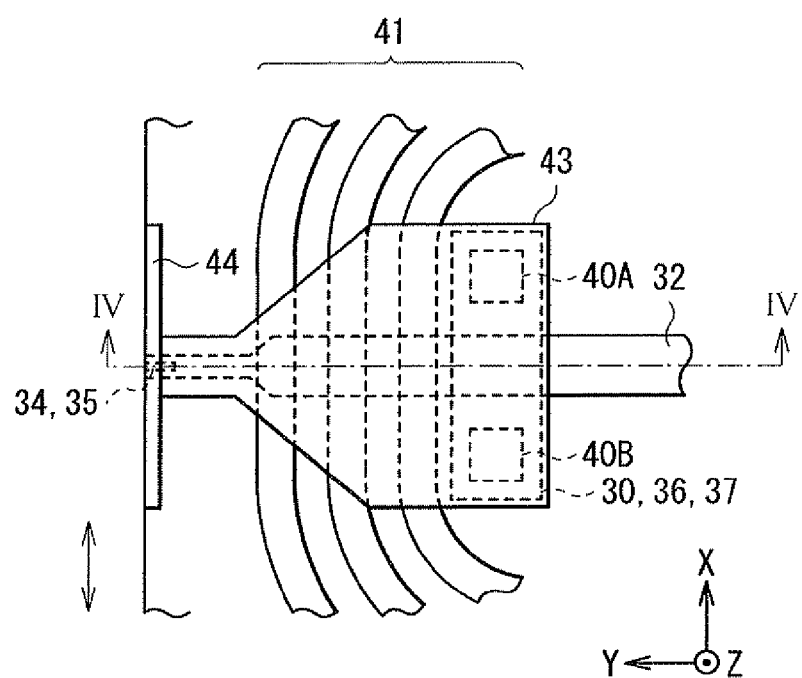
FIG. 3 is a plan view of the magnetic write/read head of FIG. 2, showing the configuration of a main part therein viewed from the direction of an arrow III.
Figure 4:
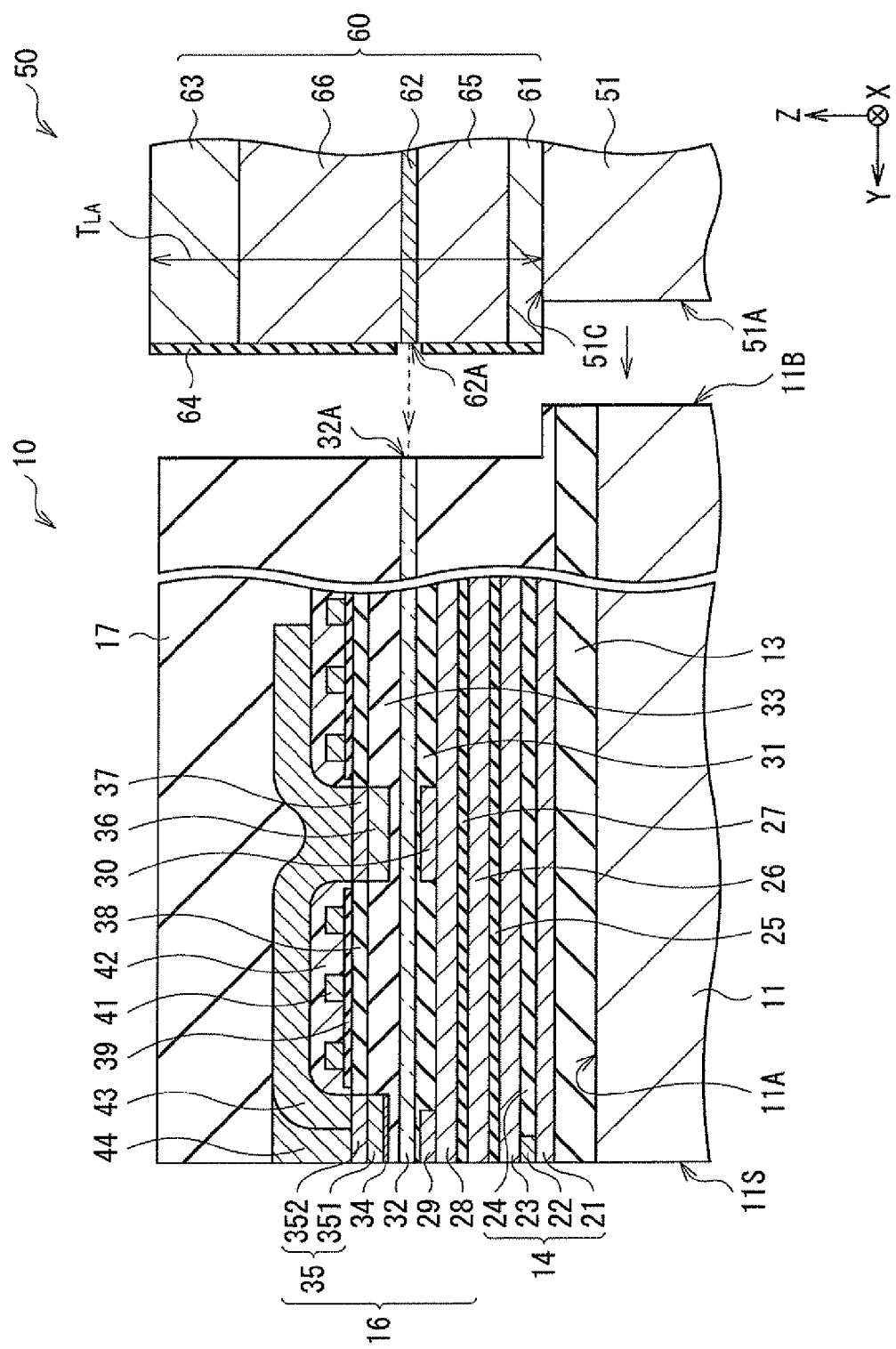
FIG. 4 is a cross sectional view of the magnetic write/read head of FIG. 3, showing the configuration thereof viewed from the direction of an arrow along a line IV-IV.
Figure 5:
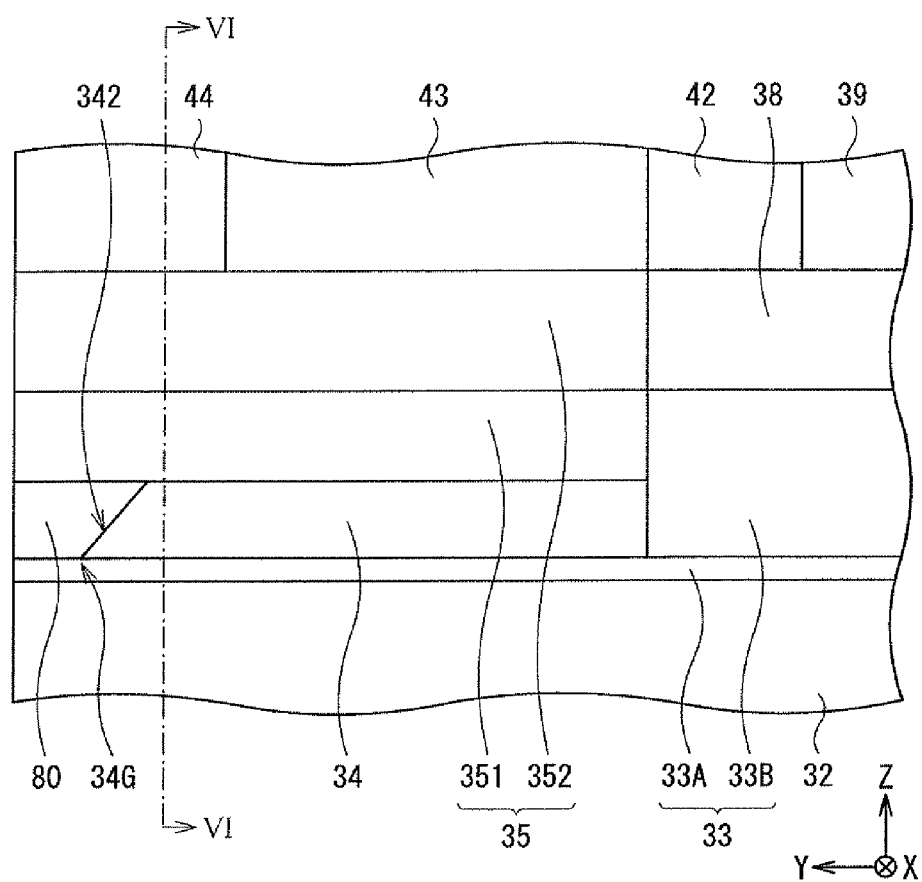
FIG. 5 is an enlarged cross sectional view of a main part of FIG. 4.
Figure 6:
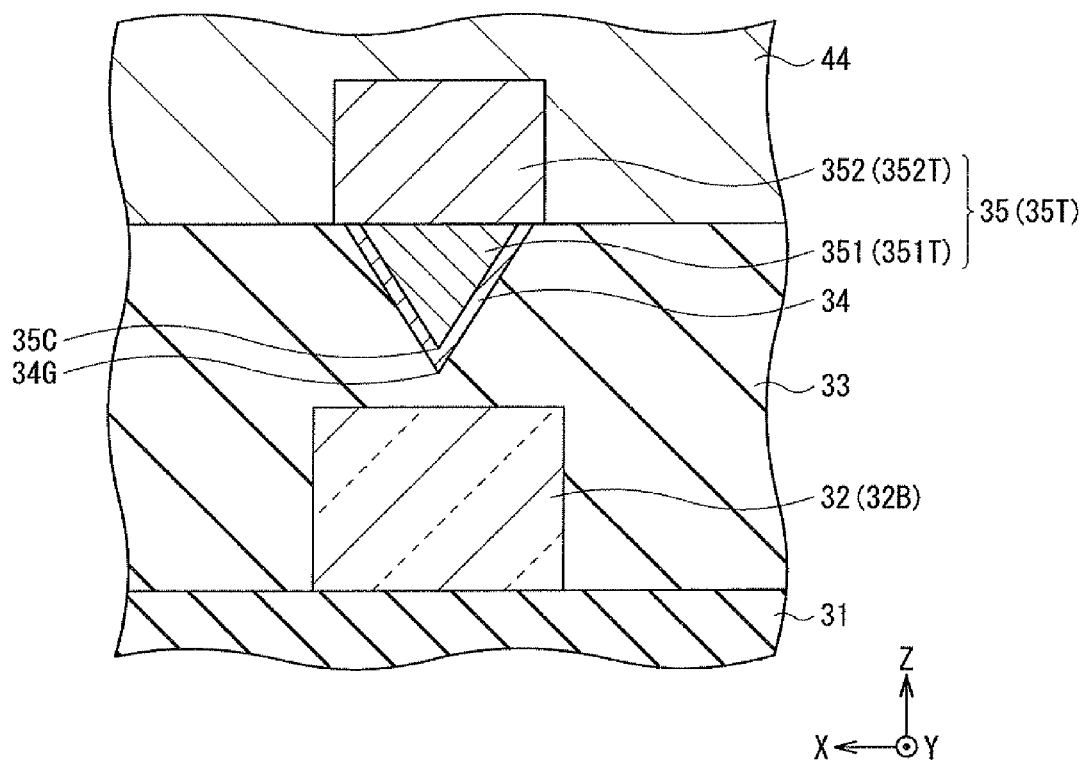
FIG. 6 is a cross sectional view of the magnetic write/read head, showing the configuration of the cross section of a primary part therein parallel to an air bearing surface.

FIG. 3 is a plan view of the magnetic write/read head 10 viewed from the direction of an arrow III of FIG. 2, FIG. 4 is a cross sectional view showing the configuration in the direction of an arrow along a line IV-IV of FIG. 3, and FIG. 5 is an enlarged cross sectional view of a main part of FIG. 4. Moreover, FIG. 6 is an enlarged view of a part of the cross section in the direction of an arrow along a line VI-VI of FIG. 5 (cross section parallel to the ABS 11S). The magnetic write/read head 10 is in the laminate structure including, in order on the base 11, an insulation layer 13, a reproduction head section 14, a write head section 16, and a protection layer 17. The reproduction head 14 and the write head section 16 are each provided with an end surface exposed from the ABS 11S.

The reproduction head section 14 is the one for performing a process of reproduction utilizing the magneto-resistive effect (MR). This reproduction head section 14 is a laminate including, in order on the insulation layer 13, a lower shield layer 21, an MR element 22, and an upper shield layer 23, for example.

The lower shield layer 21 and the upper shield layer 23 are each made of a soft magnetic metal material such as NiFe (nickel-copper alloys), for example, and are so disposed as to sandwich the MR element 22 therebetween in the direction of lamination (Z-axis direction). This offers well the function of protecting the MR element 22 from any influence of undesired magnetic field.

As to the MR element 22, one end surface thereof is exposed to the ABS 11S, and the remaining end surfaces are being in contact with an insulation layer 24, which is filling the space between the lower shield layer 21 and the upper shield layer 23. The insulation layer 24 is made of an insulation material including $Al_2O_3$ (aluminum oxide), MN (aluminum nitride), $SiO_2$ (silicon dioxide), or DLC (diamond-like carbon), for example.

The MR element 22 functions as a sensor for reading the magnetic information recorded on the magnetic disk 2. Note that, in the embodiment, in the direction orthogonal to the ABS 11S (Y-axis direction), the direction toward the ABS 11S relative to the MR element 22 or the position closer to the ABS 11S relative thereto is referred to as "front", and the direction toward the side opposite to the ABS 11S relative to the MR element 22 or the position away from the ABS 11S relative to is referred to as "rear". The MR element 22 is a CPP (Current Perpendicular to Plane)—GMR (Giant Magnetoresistive) element, for example, and a sense current flows therein in the direction of lamination. Herein, the sense current is provided to the MR element 22 with the lower shield layer 21 and the upper shield layer 23 each functioning as an electrode.

In the reproduction head section 14 in such a configuration, a free layer (not shown) included in the MR element 22 is changed in magnetization direction in accordance with the magnetic field of a signal coming from the magnetic disk 2. Therefore, the magnetization direction of the free layer shows a change relative to the magnetization direction of a pinned layer (not shown) also included in the MR element 22. When the sense current is directed to flow in the MR element 22, such a change relative to the magnetization direction appears as a change of the electrical resistance. Therefore, by using this, the magnetic field of the signal is detected, and the magnetic information is then read.

Above the reproduction head section 14, an insulation layer 25, an intermediate shield layer 26, and an insulation layer 27 are disposed one on the other in order. The intermediate shield layer 26 serves to prevent any magnetic field generated in the write head section 16 from reaching the MR element 22, and is made of a soft magnetic metal material such as NiFe, for example. The insulation layers 25 and 27 are each made of a material similar to that of the insulation layer 24, for example.

The write head section 16 is a perpendicular magnetic write head that performs a process of writing in a mode of thermally-assisted magnetic writing. This write head section 16 includes, above the insulation layer 27 in order, a lower yoke layer 28, a leading shield 29, a coupling layer 30, a clad layer 31, a waveguide 32, and a clad layer 33, for example.

The lower yoke layer 28, the leading shield 29, and the coupling layer 30 are each made of a soft magnetic material such as NiFe. The leading shield 29 is positioned at the forefront on the upper surface of the lower yoke layer 28, and is so disposed that one end surface thereof is exposed from the ABS 11S. The coupling layer 30 is positioned at the rear of the leading shield 29 on the upper surface of the lower yoke layer 28. The clad layer 31 is made of a dielectric material whose index of refraction is lower than that of the waveguide 32, and is so disposed as to cover the lower yoke layer 28, the leading shield 29, and the coupling layer 30. The waveguide 32 provided on the clad layer 31 is extended in the direction orthogonal to the ABS 11S (Y-axis direction), and one end surface thereof is exposed from the ABS 11S, and the remaining end surface thereof is exposed in the rear. Note here that the end surface of the waveguide 32 in the front may not be exposed from the ABS 11S, and may be positioned in the rear of the ABS 11S. The waveguide 32 is made of a dielectric material that passes a laser light therethrough. The clad layers 31 and 33 are each made of a dielectric material whose index of refraction with respect to the laser light coming over the waveguide 32 is lower than that of the waveguide 32. When the waveguide 32 is made of $Al_2O_3$ (aluminum oxide), for example, the clad layers 31 and 33 may be each made of $SiO_2$ (silicon dioxide). Alternatively, the waveguide 32 may be made of $Ta_2O_5$ (tantalum oxide), and the clad layers 31 and 33 may be each made of $Al_2O_3$. Herein, as shown in FIG. 5 in detail, the clad layer 33 is configured by a buffer portion 33A for separation use between the waveguide 32 and a plasmon generator 34, and a rear portion 33B positioned in the rear of the plasma generator 34 (will be referred to later).

The write head section 16 is provided also with the plasmon generator 34, and a magnetic pole 35. The plasmon generator 34 is disposed above the front end portion of the waveguide 32 via the buffer portion 33A of the clad layer 33, and the magnetic pole 35 is so disposed as to come in contact with the upper surface of the plasmon generator 34. As to the magnetic pole 35, one end surface thereof is so disposed as to be exposed from the ABS 11S. On the other hand, as shown in FIG. 5, the plasmon generator 34 is so positioned that an end surface 342 thereof comes in the rear of the ABS 11S, and in front of the plasmon generator 34, a protection layer 80 is provided (not shown in FIG. 4).

The magnetic pole 35 is in the laminate structure including a first layer 351 and a second layer 352 disposed one on the other on the plasmon generator 34 in this order. The first layer 351 and the second layer 352 are each made of a magnetic material with a high saturation flux density such as iron-based alloys. Such iron-based alloys include FeCo (iron-cobalt alloys), FeCoNi (iron-cobalt-nickel alloys), or others. The Plasmon generator 34 is made of a conductive material including at least one of Pd (palladium), Pt (platinum), Rh (rhodium), Ir (iridium), Ru (ruthenium), Au (gold), Ag (silver), Cu (copper), and Aluminum (Al), for example. The protection layer 80 is provided for protecting the plasmon generator 34 from any physical action and chemical action, and is made of a material including at least one of Ni (nickel), Fe (iron), Co (cobalt), Cr (chromium), Ta (tantalum), Ti (titanium), Ru (ruthenium), W (tungsten), and Mo (molybdenum), or a material including at least one of $Al_2O_3$ (aluminum oxide), AlN (aluminum nitride), BN (boron nitride), $SiO_2$ (silicon dioxide), SiC (silicon carbide), DLC (diamond-like carbon), AgNi, AgPd, AuNi, AuCu, and AlNi, for example.

The plasmon generator 34 is the one for generating a near-field light NF (that will be referred to later) from a tip end portion 34G thereof based on a laser light coming over the waveguide 32. The magnetic pole 35 is the one for accommodating therein a magnetic flux generated in a coil 41 (will be referred to later), and by discharging the magnetic flux from the ABS 118, generates a recording magnetic field for use to record the magnetic information onto the magnetic disk 2. As to the end surface 342 of the plasmon generator 34, the tip end portion 34G thereof located closest to the waveguide 32 is desirably positioned in the closest vicinity of the ABS 11S, and is desirably tilted against the ABS 11S in such a manner as to be away not only from the waveguide 32 but also from the ABS 11S. With the tilting of the end surface 342 as such, compared with the end surface not tilted as such, the magnetic flux passing through the magnetic pole 35 is pulled toward the plasmon generator 34 although slightly. As a result, in the ABS 11S, the position where the near-field light NF is generated and the position where the magnetic flux is discharged are brought closer to each other. Moreover, with the tilting of the end surface 342 as such, compared with the end surface not tilted as such, the protection layer 80 positioned in the front is prevented from falling off without impairing the level of intensity of the near-field light NF reaching the magnetic disk 2. That is, when the end surface 342 is parallel to the ABS 11S, for avoiding any possible fall off of the protection layer 80, the protection layer 80 may be increased in size in the Y-axis direction to increase the area of contact with the buffer portion 33A of the clad layer 33 or with the first layer 351 of the magnetic pole 35, for example. With the size increase as such, however, the end surface 342 of the plasmon generator 34 is to be positioned away from the ABS 11S, thereby resultantly decreasing the level of intensity of the near-field light NF reaching the magnetic disk 2. In consideration thereof, in the embodiment, with the tilting of the end surface 342, the area of contact between the protection layer 80 and the end surface 342 is successfully increased without increasing the distance between the tip end portion 34G and the ABS 11S. With such a configuration, the near-field light NF reaching the magnetic disk 2 is prevented from being decreased in level of intensity, and the protection layer 80 is protected not to fall off. The plasmon generator 34 and the first layer 351 are both embedded in the clad layer 33. Note here that as to the plasmon generator 34 and the magnetic pole 35, the details about their configurations and functions, for example, will be described later.

The recording head section 16 is also configured to include a coupling layer 36, and a coupling layer 37. The coupling layer 36 is embedded in the clad layer 33 in the rear of the protection layer 80, the plasmon generator 34, and the magnetic pole 35. The coupling layer 37 is so provided as to come in contact with the upper surface of the coupling layer 36. These coupling layers 36 and 37 are both positioned above the coupling layer 30, and are each made of a soft magnetic metal material such as NiFe.

As shown in FIG. 3, the recording head section 16 is provided with two coupling portions 40A and 40B, which are respectively embedded in the clad layers 31 and 32. These coupling portions 40A and 40B are also each made of a soft magnetic metal material such as NiFe. The coupling portions 40A and 40B are each extended in the Z-axis direction in such a manner as to couple between the coupling layer 30 and the coupling layer 36. Moreover, in the X-axis direction, those are so provided as to sandwich the waveguide 32 therebetween, and to be each away from the waveguide 32.

Above the clad layer 33, an insulation layer 38 is so provided as to fill around the second layer 352 of the magnetic pole 35. Above such an insulation layer 38, an insulation layer 39 and a coil 41 are disposed one on the other in order. The coil 41 is formed to wind around the coupling layer 37. The coil 41 is the one that generates a magnetic flux for recording use by the flow of a write current therethrough, and is made of a highly conductive material such as Cu (copper) and Au (gold). These insulation layers 38 and 39 are each made of an insulation material including $Al_2O_3$, AlN, $SiO_2$, or DLC, for example. These insulation layers 38 and 39 and the coil 41 are all covered by an insulation layer 42, and in such a manner as to cover the insulation layer 42, an upper yoke layer 43 is provided. The insulation layer 42 is made of a non-magnetic insulation material including photoresist or spin on glass (SOG) that is fluidized while it is heated, for example. The insulation layers 38, 39, and 42 are each provided to electrically separate the coil 41 from the area therearound. The upper yoke layer 43 is made of a soft magnetic material with a high saturation flux density such as CoFe. The front portion thereof is in contact with the second layer 352 of the magnetic pole 35, and in the rear, a part thereof is connected to the coupling layer 37. Moreover, the front end surface of the upper yoke layer 43 is positioned in the rear of the ABS 11S, and between the ABS 11s and the upper yoke layer 43, a heat sink 44 is provided.

As shown in FIGS. 4 to 6, the heat sink 44 is provided with an end surface exposed from the ABS 11S, for example, and is extended in the direction (—Y direction) to be away from the ABS 11S while it is being in contact with the second layer 352 of the magnetic pole 35. The heat sink 44 functions mainly to prevent any possible temperature increase of the magnetic pole 35 being in contact with the plasmon generator 34. Therefore, this heat sink 44 has a thermal conductivity at least higher than that of the clad layer 33, and especially, desirably has a thermal conductivity higher than that of the magnetic pole 35. Note that when the clad layer 33 is made of a material of $Al_2O_3$, the thermal conductivity thereof is about 30 W/(m·K) at the maximum, and when it is made of $SiO_2$, the maximum thermal conductivity thereof is only about 1.3 W/(m·K) at the maximum. Moreover, when the magnetic pole 35 is made of a material being alloys of Co, Ni, and Fe, the thermal conductivity thereof is about 90 W/(m·K).

To be specific, the heat sink 44 may be made of at least one of Ag (silver), Cu (copper), Au (gold), Al (aluminum), W (tungsten), Si (silicon), Ir (iridium), Mo (molybdenum), Zn (zinc), Ru (ruthenium), Co (cobalt), Ni (nickel), Cr (chromium), Fe (iron), Pt (platinum), Rh (rhodium), Sn (tin), Ta (tantalum), Nb (niobium), diamond, AlN (aluminum nitride), SiC (silicon carbide), SiAlN, and BN (boron nitride). Among these materials, those not including Co, Ni, and Fe are considered preferable because they hardly lead to any magnetic effects such as erroneous deletion of magnetic information from any adjacent tracks not being targets for writing, for example. Moreover, among the materials described above, Cu, W, Si, Mo, Zn, Ru, Cr, Pt, Rh, Ta, Nb, AlN, SiC, and SiAlN are considered preferable because with them, the process of polishing during the formation of the ABS 11S in the manufacturing process is relatively easy. Especially W, Si, Mo, Ru, Cr, Pt, Rh, Ta, Nb, AlN, SiC, and SiAlN are considered preferable because they are superior in corrosion resistance and structural stability, and are high in long-term reliability. Moreover, among these, because AlN, SiC, and SiAlON are each electrically insulative, they are considered preferable as not requiring any measures (e.g., patterning) to be taken to prevent contact with any other metallic portions (e.g., wiring patterns) during the manufacturing process.

In the write head section 16 configured as such, the write current flowing through the coil 41 generates a magnetic flux inside of a magnetic path configured mainly by the leading shield 29, the lower yoke layer 28, the coupling layer 30, the coupling portions 40A and 40B, the coupling layers 36 and 37, the upper yoke layer 43, and the magnetic pole 35. As a result, the magnetic field of a signal is generated in the vicinity of the end surface exposed from the ABS 11S of the magnetic pole 35, and this magnetic field of the signal is directed to reach a predetermined area portion on the recording surface (will be referred to later) of the magnetic disk 2.

Moreover, with such a magnetic write/read head 10, the protection film 17 made of $Al_2O_3$ or others is so formed as to cover the upper surface of the write head section 16 in its entirety.

The light source unit 50 provided in the rear of the magnetic write/read head 10 is configured to include a laser diode 60 serving as a light source for emission of a laser light, and a support member 51 in the shape of a rectangular parallelepiped that supports this laser diode 60.

The support member 51 is made of a ceramic material including $Al_2O_3$·TiC, for example. As shown in FIG. 4, the support member 51 is provided with an attachment surface 51A that is to be attached to a rear surface 11B of the base 11, and a light source placement surface 51C orthogonal to this attachment surface 51A. The light source placement surface 51C is parallel to the element forming surface HA. The laser diode 60 is mounted on the light source placement surface 51C. The support member 51 is desirably provided not only with a function of supporting the laser diode 60 but also with a function like a heat sink of dissipating heat to be generated by the laser diode 60.

As the laser diode 60, the one generally used for communications use, for storage use of optical disks, or for material analysis use including InP, GaAs, GaN, and others are applicable for use. The laser light coming from the laser diode 60 may take any value of wavelength in the range of 375 nm to 1.7 µm. To be specific, exemplified is a laser diode made of InGaAsP/InP quaternary alloys whose wavelength range for light emission is 1.2 to 1.67 µm. As shown in FIG. 4, the laser diode 60 is in the multilayer structure including a lower electrode 61, an active layer 62, and an upper electrode 63. Between the lower electrode 61 and the active layer 62, an n-type semiconductor layer 65 including n-type AlGaN is inserted, and a p-type semiconductor layer 66 including p-type AlGaN is inserted between the active layer 62 and the upper electrode 63, for example. The two cleavage surfaces in this multilayer structure are each provided with a reflection layer 64 made of $SiO_2$, $Al_2O_3$, or others for excitation of oscillation by reflection of a light entirely thereon. The reflection layer 64 is provided with an aperture at the position including a light-emission center portion 62A of the active layer 62 for emission of laser light. The relative position between the light source unit 50 and the magnetic write/read head 10 is so fixed as to have the positional match between the light-emission center portion 62A and a rear end surface 32A of the waveguide 32 by attaching the attachment surface 51A of the support member 51 to the rear surface 11B of the base 11. The laser diode 60 has the thickness $T_{LA}$ of about 60 to 200 µm, for example. When a predetermined level of voltage is applied between the lower electrode 61 and the upper electrode 63, a laser light comes from the light-emission center portion 62A of the active layer 62, and then is directed to enter the rear end surface 32A of the waveguide 32. Note here that the laser light coming from the laser diode 60 is preferably a TM-mode polarized light with which the oscillation direction of the magnetic field is vertical to the surface of the active layer 62. For driving of the laser diode 60, the use of a power source in the magnetic disk device is possible. The magnetic disk device is generally provided with a power source that generates a voltage of about 2V, for example, and such a level of the voltage of this power source is enough to drive the laser diode 60. Moreover, the power consumption of the laser diode 60 is about several tens of mW, for example, and this may be adequately taken care of by the power source in the magnetic disk device.

Figure 7:
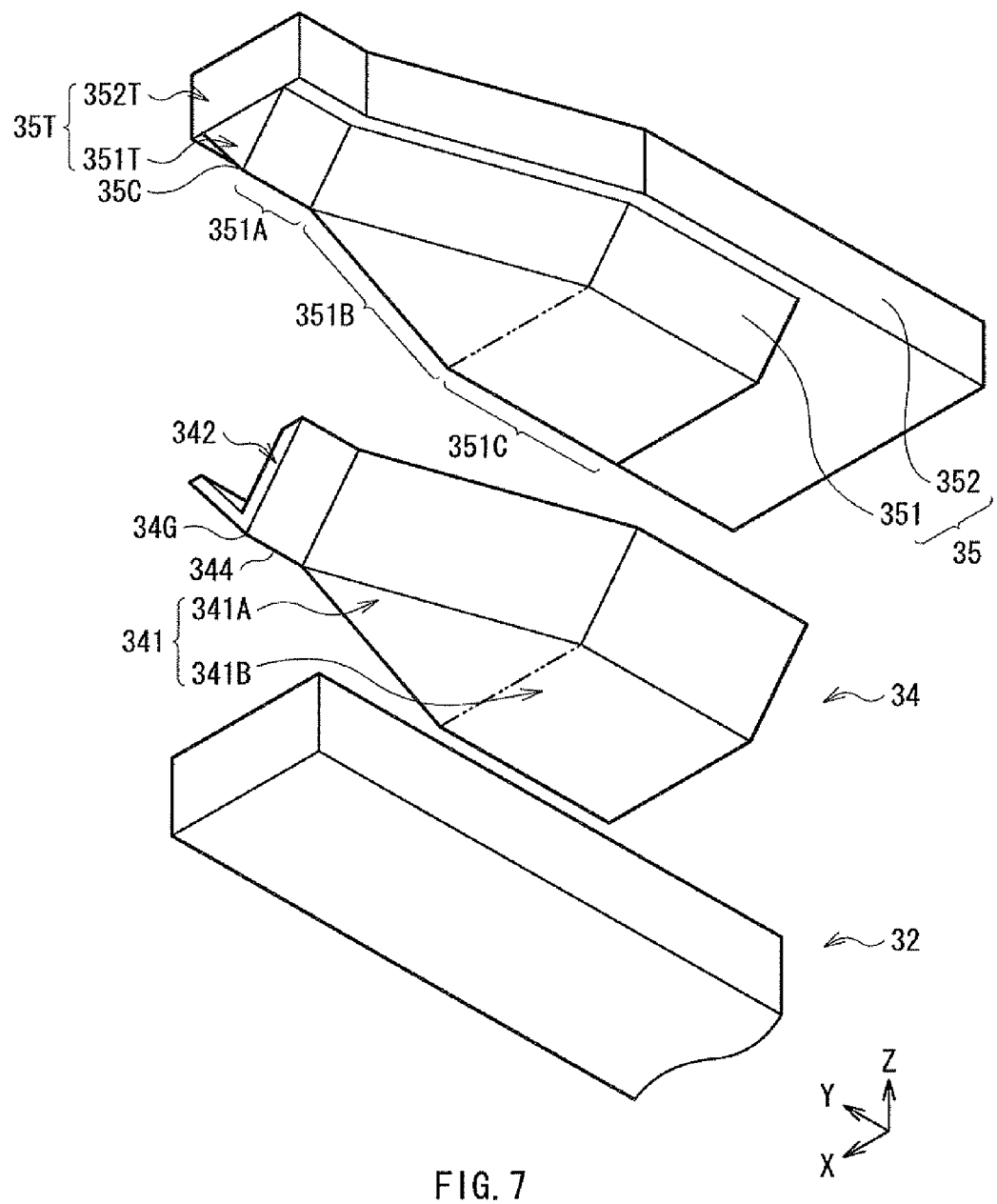
FIG. 7 is an exploded perspective view of the magnetic write/read head, showing the configuration of the primary part therein.
Figure 8:
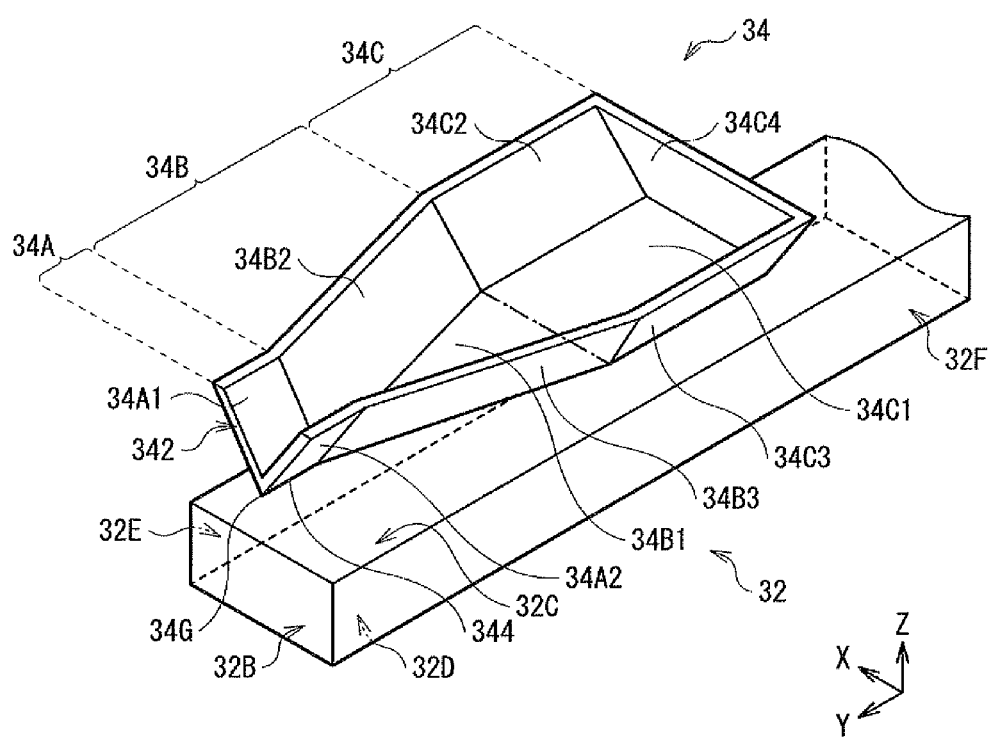
FIG. 8 is another perspective view of the magnetic write/read head, showing the configuration of the primary part therein.
Figure 9:
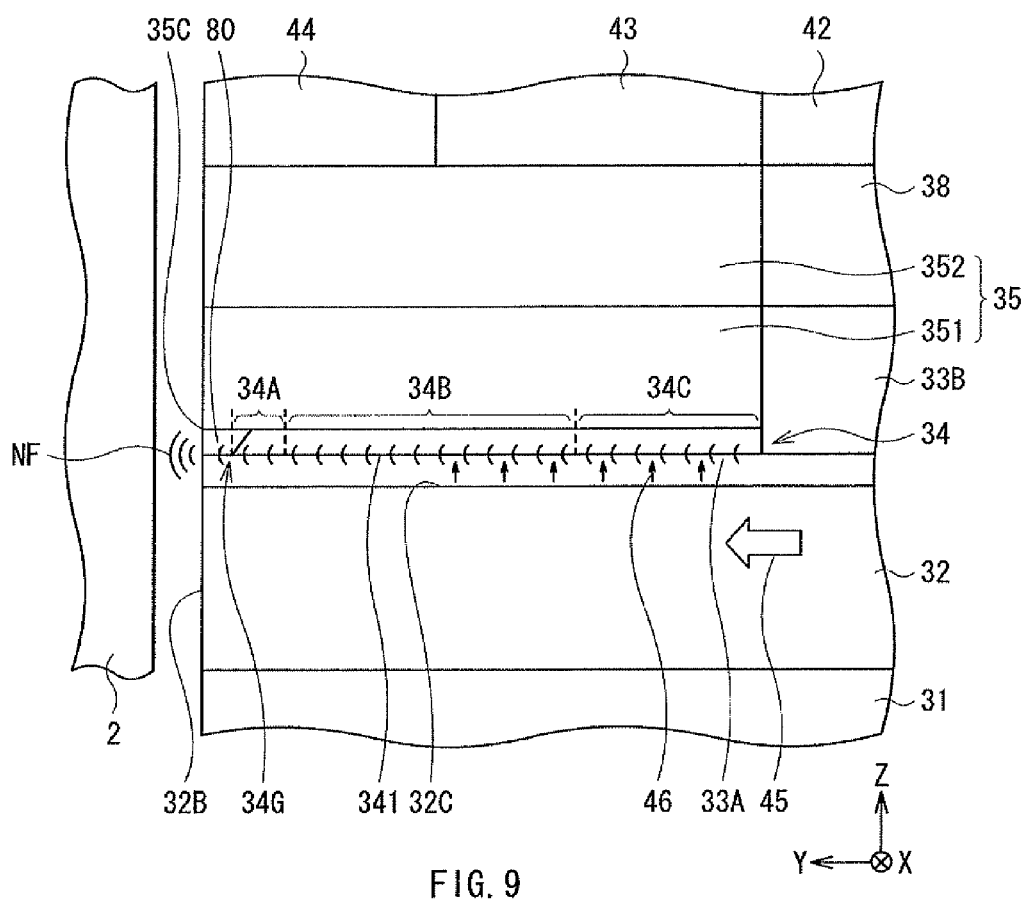
FIG. 9 is a cross sectional view of the magnetic write/read head, showing the configuration of the cross section of the primary part therein orthogonal to the air bearing surface.
Figure 10:
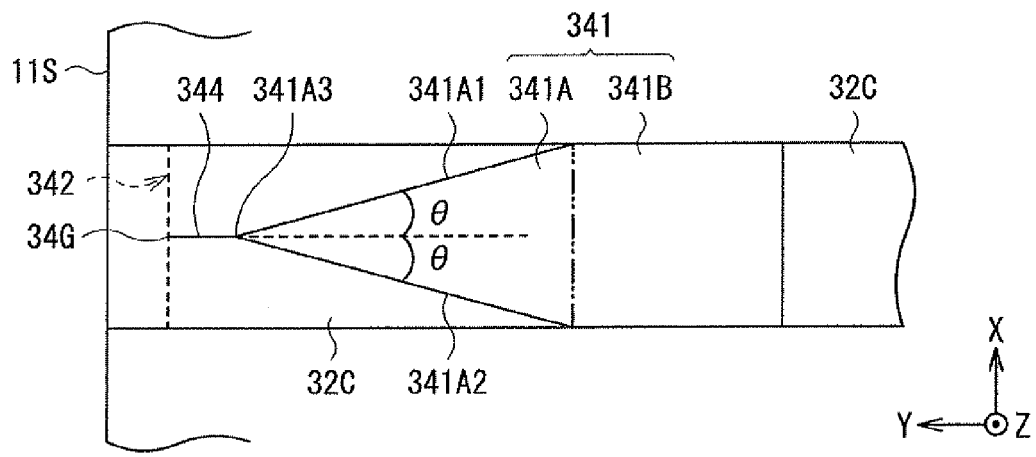
FIG. 10 is a plan view of the magnetic write/read head, showing the primary part therein.

Next, by referring to FIGS. 7 to 10, a detailed description is provided about the waveguide 32, the plasmon generator 34, and the magnetic pole 35 in terms of configuration and function, for example. FIG. 7 is an exploded perspective view of the waveguide 32, the plasmon generator 34, and the magnetic pole 35, showing their configurations. FIG. 8 is a perspective view of the waveguide 32 and the plasmon generator 34, showing their shapes and positional relationship. FIG. 9 shows the configurations and functions of the waveguide 32, the plasmon generator 34, and the magnetic pole 35, and is a cross sectional view orthogonal to the ABS 11S. FIG. 10 is a plan view of the main part of the plasmon generator 34, showing the state viewed from the above.

In addition to the rear end surface 32A of FIG. 4, as exemplarily shown in FIG. 8, the waveguide 32 is configured to include an end surface 32B closer to the ABS 11S, an evanescent light generation surface 32C being an upper surface, a lower surface 32D, and two side surfaces 32E and 32F. The evanescent light generation surface 32C generates an evanescent light based on the laser light coming over the waveguide 32. FIGS. 7 to 10 each show an exemplary layout in which the end surface 32B is disposed to the ABS 11S, but alternatively, the end surface 32B may be disposed at the position away from the ABS 11S.

As shown in FIGS. 7 and 8, the plasmon generator 34 is configured to include a first portion 34A, a second portion 34B, and a third portion 34C, which are disposed in order from the side of the ABS 11S. In FIG. 8, the border between the first portion 34A and the third portion 34C is indicated by a chain double-dashed line.

The first portion 34A is so configured that a pair of side walls 34A1 and 34A2 each being in the shape of a plate are connected to each other at an edge 344 so as to form the shape of a letter V on the cross section parallel to the ABS 11S. These side walls 34A1 and 34A2 are each provided with the front end surface 342 being in contact with the protection layer 80. The edge 344 is a border portion between the side walls 34A1 and 34A2 in pair, and from the tip end portion 34G being a starting point in touch with the protection layer 80, is extended in the Y-axis direction until it reaches the second portion 34B. The edge 344 is opposing the evanescent light generation surface 32C of the waveguide 32, and the side walls 34A1 and 34A2 are so tilted as to increase the distance therebetween in the X-axis direction from the edge 344 being a starting point as are away from the waveguide 32. Note here that the cross section of the first portion 34A being parallel to the ABS 11S remains in the same shape irrespective of the distance from the ABS 11S.

The second portion 34B is configured to include a bottom portion 34B1, and two side walls 34B2 and 34B3 each in the shape of a plate. The bottom portion 34B1 is in the shape of a plate, and is opposing the evanescent light emission surface 32C. The bottom portion 34B1 is so configured that the width thereof in the track width direction (X-axis direction) is zero at the border portion with the first portion 34A, and is to be increased as is away from the ABS 11S. The side walls 34B2 and 34B3 are provided upright toward the side opposite to the waveguide 32 at the respective edge ends of the bottom portion 34B131 in the X-axis direction. Herein, the side walls 34B2 and 34B3 are so tilted that the distance therebetween (distance in the X-axis direction) is increased as are away from the waveguide 32 from the connection portion with the bottom portion 34B1 as a starting point. Moreover, the side walls 34B2 and 34B3 are respectively coupled to the side walls 34A1 and 34A2 in the first portion 34A.

The third portion 34C is configured to include a bottom portion 34C1, a side wall 34C2, a side wall 34C3, and a wall portion 34C4. The bottom portion 34C1 is contiguous to the bottom portion 34B131 of the second portion 34B. The side wall 34C2 is contiguous to the side wall 34B2 of the second portion 34B, and the side wall 34C3 is contiguous to the side wall 34B3 of the second portion 34B. The wall portion 34C4 is coupled to all of the rear end portions of the bottom portion 34C1, and the side walls 34C2 and 34C3. Herein, the side walls 34C2 and 34C3 are so tilted that the distance therebetween (distance in the X-axis direction) is increased as are away from the waveguide 32 from the connection portion with the bottom portion 34C1 as a starting point. Moreover, as to the side walls 34C2 and 34C3, their upper end edges are extended to be parallel to each other. Note here that the wall portion 34C4 is not necessarily provided.

As shown in FIGS. 7 and 8, the first portion 34A, the second portion 34B, and the third portion 34C form a space therein to house the first layer 351 of the magnetic pole 35.

As shown in FIG. 7, in the bottom portions 34B1 and 34C1, the surfaces opposing the evanescent light generation surface 32C of the waveguide 32 with a predetermined space each therefrom are respectively first and second surfaces 341A and 341B configuring a surface plasmon excitation surface 341. In FIG. 7, the border between the first surface 341A and the second surface 341B is indicated by a chain double-dashed line.

As shown in FIGS. 6 and 7, the magnetic pole 35 is provided with an end surface 35T exposed from the ABS 11S. This end surface 35T includes an end surface 351T, and an end surface 352T. The end surface 351T is exposed from the ABS 11S in the first layer 351, and the end surface 352T is exposed from the ABS 11S in the second layer 352.

The first layer 351 of the magnetic pole 35 is housed in the space formed by the first portion 34A of the plasmon generator 34, the second portion 34B thereof, and the third portion 34C thereof. More in detail, the first layer 351 includes a first portion 351A occupying the space formed by the first portion 34A, a second portion 351B occupying the space formed by the second portion 34B, and a third portion 351C occupying the space formed by the third portion 34C. The first portion 351A is in the shape of a triangular prism being in close contact with the side walls 34A1 and 34A2 in the first portion 34A of the plasmon generator 34, and the area of the cross section parallel to the ABS 11S remains the same. The end surface 351T of the first portion 351A includes a sharp-pointed end 35C located at the vertex on the side opposite to the second layer 352. The second portion 351B is being in close contact with the side walls 34B2 and 34B3, and the bottom portion 34B1 in the second portion 34B of the plasmon generator 34. The second portion 351B is so configured that the width thereof in the X-axis direction is increased as is away from the ABS 11S, and is increased as is away from the waveguide 32 in the Z-axis direction. The third portion 351C is being in close contact with the side walls 34C2 and 34C3, and the bottom portion 34C1 of the third portion 34C of the plasmon generator 34. The third portion 351C is so configured that the width thereof in the X-axis direction remains constant in the Y-axis direction, and is increased as is away from the waveguide 32 in the Z-axis direction.

The second layer 352 of the magnetic pole 35 includes a lower surface that is in contact with the upper surface of the first layer 351, and with the upper end surface of each of the first to third portions 34A to 34C of the plasmon generator 34.

As shown in FIG. 9, in the clad layer 33, the portion disposed between the evanescent light generation surface 32C and the surface plasmon excitation surface 341 serves as the buffer portion 33A.

FIG. 10 is a plan view showing the positional relationship between the surface plasmon excitation surface 341 and the evanescent light generation surface 32C, showing the state of the plasmon generator 34 and the waveguide 32 viewed from the side of the magnetic pole 35. Note here that, as to the plasmon generator 34, only the side opposing the evanescent light generation surface 32C is shown, and the remaining portion is not shown. As shown in FIG. 10, the first surface 341A is reduced in width in the X-axis direction as is moved closer to the ABS 11S. The first surface 341A includes a front end portion 341A3 at a position where end edges 341A1 and 341A2 intersect each other in the X-axis direction. The angles respectively formed by these end edges 341A1 and 341A2 in the direction vertical to the ABS 11S (Y-axis direction) are the same. In the below, such an angle is denoted by θ. The angle θ falls within the range from 3° to 50°, for example, and preferably, falls especially within the range from 10° to 25°.

(Manufacturing Method of Slider)

Next, by referring to FIGS. 11 to 22 in addition to FIG. 4, described is a manufacturing method of the slider 4A provided with the magnetic write/read head 10. FIGS. 11 to 22 are for illustrating the procedure for forming the primary part of the magnetic write/read head 10, and showing the cross sectional configuration of the position eventually serving as the ABS 11S. In the below, first of all, the outline of the entire procedure for manufacturing is described by referring to FIG. 4, and then by referring to FIGS. 11 to 22, a detailed description is given about the procedure for forming the primary part (the plasmon generator 34, the magnetic pole 35, the heat sink 44, and the protection layer 80). In the below, the details about the material forming such a series of configuration components, the shape thereof, and others are already described, and thus are not described twice if appropriate.

The magnetic write/read head 10 is manufactured by disposing a series of configuration components one on the other in order using any existing thin film process. This existing thin film process includes a film formation technology such as electrolytic plating or sputtering, a patterning technology such as photolithography, an etching technology such as dry etching or wet etching, a polishing technology such as chemical mechanical polishing (CMP), and others.

In this example, first of all, a wafer (not shown) made of AlTiC is made ready. This wafer is the one to eventually serve as a plurality of bases 11. Next, on this wafer, a laminate structure that eventually serves as the magnetic write/read head 10 is plurally formed like an array. To be specific, first of all, the wafer is formed thereon with the insulation layer 13 in its entirety. Thereafter, the insulation layer 13 is formed thereon with, one on the other in order, the lower shield layer 21, the MR element 22, the insulation layer 24, and the upper shield layer 23, thereby forming a plurality of read head sections 14. Next, the resulting read head sections 14 are formed thereon with, one on the other in order, the insulation layer 25, the intermediate shield layer 26, and the insulation layer 27. Thereafter, the insulation layer 27 is formed thereon with, one on the other in order, the lower yoke layer 28, the leading shield 29, the coupling layer 30, the clad layer 31, the waveguide 32, the clad layer 33, the plasmon generator 34, the magnetic pole 35, and the coupling layers 36 and 37. Moreover, the insulation layer 38 is so formed as to cover the structure in its entirety, and then the magnetic pole 35, the insulation layer 38, and the coupling layer 37 are made flat on their upper surfaces by a process of flattening. Thereafter, the coil 41 being embedded in the insulation layers 39 and 42 is formed. Moreover, after the formation of the upper yoke layer 43 connected to the magnetic pole 35 and the coupling layer 37, the heat sink 44 is so formed as to come in contact with a part of the magnetic pole 35 so that a plurality of write head sections 16 are completely manufactured. Thereafter, by forming the protection film 17 on the resulting write head sections 16, a laminate structure is formed plurally like an array. Note here that, on the wafer, formed are not only such laminate structures but also a wrapping guide pattern (dummy resistor) made of a conductive material. This wrapping guide pattern is for use to control the amount of polishing during the process of polishing to be performed later, and one or more wrapping guide patterns are provided to each area between any two adjacent laminate structures on the wafer.

Thereafter, the wafer is cut along the alignment direction of these laminate structures, thereby forming a plurality of bars (not shown) so formed as to align the laminate structures. Moreover, the end surfaces of the laminate structures in the bars as such are collectively subjected to mechanical polishing or others so that the ABS 11S are formed. In this manner, the magnetic write/polishing head 10 are completely manufactured with the read head sections 14 and the write head sections 16. Note that, when the ABSs 11S are formed as such, the protection layer 80 is also formed, and this will be described later in detail. After the formation of the ABSs 11S, the bars are cut on the magnetic write/read head 10 basis, and the resulting bars are processed to be in any predetermined shape (e.g., in the shape of a rectangular parallelepiped). As such, the slider 4 is completely formed with the magnetic write/read head 10 provided to the element forming surface 11A of the base 11.

Figure 11:
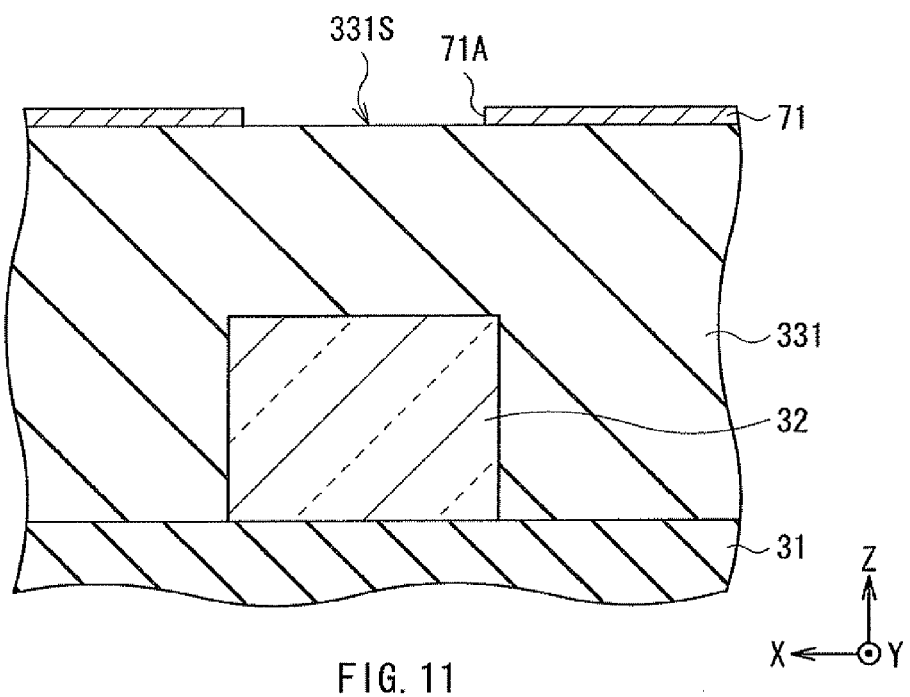
FIG. 11 is a cross sectional view of the magnetic write/read head for illustrating a process of manufacturing the primary part therein.

For forming the primary part of the magnetic write/read head 10, first of all, as shown in FIG. 11, a dielectric layer 331 is so formed as to cover the waveguide 32 provided on the clad layer 31. The dielectric layer 331 is the one to serve later as a part of the clad layer 33, and is made of the predetermined dielectric material described above. Thereafter, on the dielectric layer 331, an etching mask 71 made of metal or others is formed. This etching mask 71 is provided with an aperture 71A that is slightly larger in size than the outer rim of the upper end of the plasmon generator 34 that is to be formed later.

Figure 12:
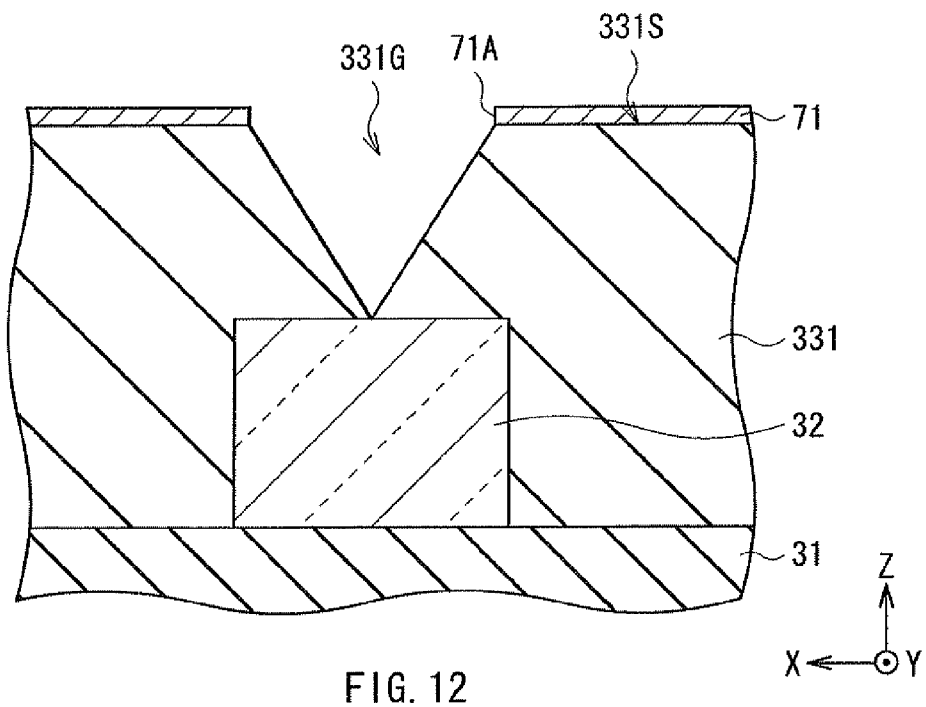
FIG. 12 is a cross sectional view for illustrating a process subsequent to the process of FIG. 11.

Next, as shown in FIG. 12, the portion corresponding to the aperture 71A of the dielectric layer 331 (exposed portion) is dug deep by reactive ion etching or others, thereby forming a groove 331G to the dielectric layer 331. This groove 331G is so formed that the lower end thereof reaches the upper surface of the waveguide 32. Herein, the groove 331G is so shaped as to be slightly larger than the outer shape of the plasmon generator 34 that is to be formed later.

Figure 13:
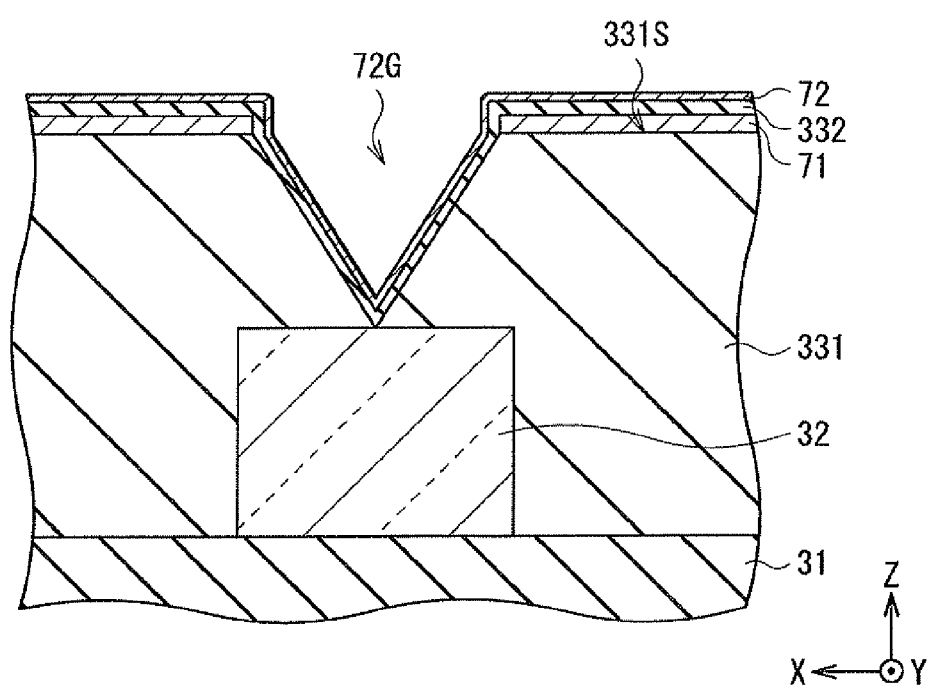
FIG. 13 is a cross sectional view for illustrating a process subsequent to the process of FIG. 12.

Thereafter, as shown in FIG. 13, by sputtering or others, a dielectric layer 332 is so formed as to cover the upper surface of the structure of FIG. 12 in its entirety. Similarly to the dielectric layer 331, the dielectric layer 332 serves later as a part of the clad layer 33, and is made of the predetermined dielectric material described above. After the formation of the dielectric layer 332, by sputtering or others, a close-contact film 72 is so formed as to cover the dielectric layer 332. This close-contact film 72 is made of Ti (titanium) or Ta (tantalum), and has a function of increasing the degree of close contact between the clad layer 33 and the plasmon generator 34. The close-contact film 72 has the thickness of about 1 nm. The dielectric layer 332 and the close-contact film 72 are formed also to the areas corresponding to the groove 331G and to the aperture 71A. The laminate structure after the formation of the close-contact film 72 is in the state that a concave portion 72G is formed for housing therein the plasmon generator 34 that is to be formed later.

Figure 14:
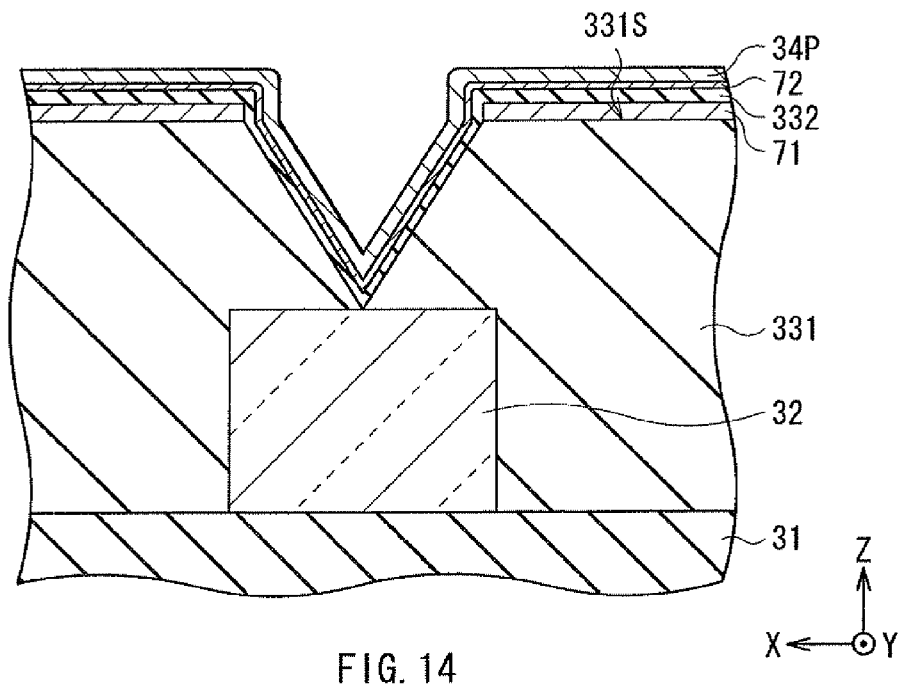
FIG. 14 is a cross sectional view for illustrating a process subsequent to the process of FIG. 13.
Figure 15:
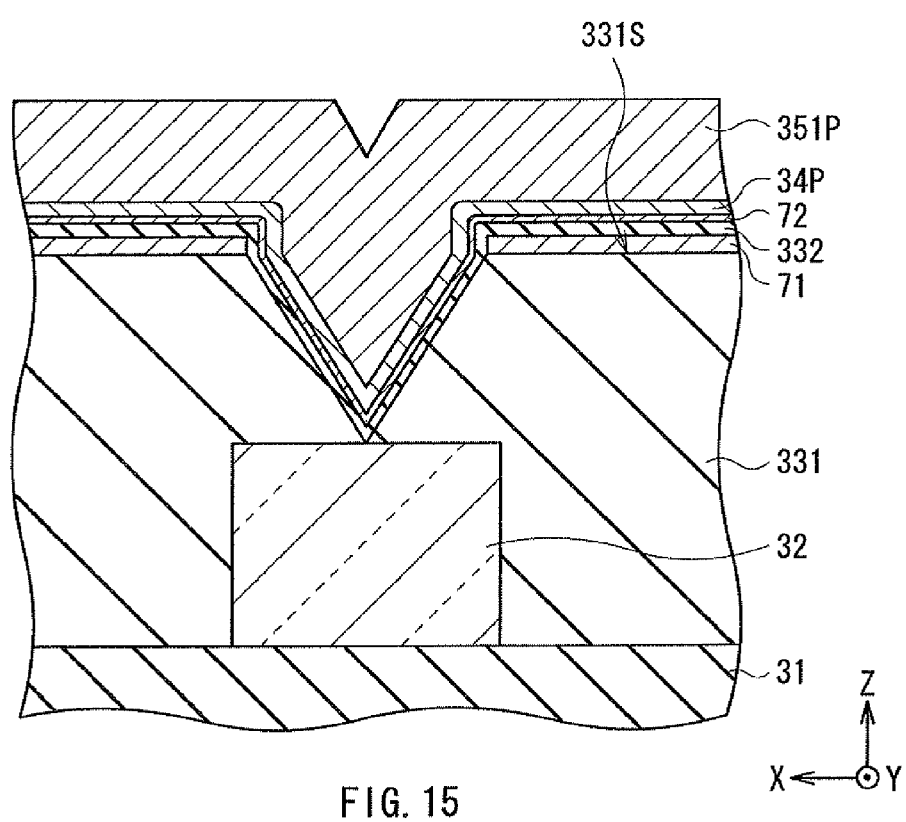
FIG. 15 is a cross sectional view for illustrating a process subsequent to the process of FIG. 14.

Next, as shown in FIG. 14, by sputtering or others, a metallic film 34P serving later as the plasmon generator 34 is so formed as to cover the close-contact film 72 in its entirety. Moreover, as shown in FIG. 15, by plating or others, the metallic film 34P is formed thereon with a magnetic layer 351P that is to serve later as the first layer 351 of the magnetic pole 35. The magnetic layer 351P is so formed as to completely fill at least the groove 331G.

Figure 16:
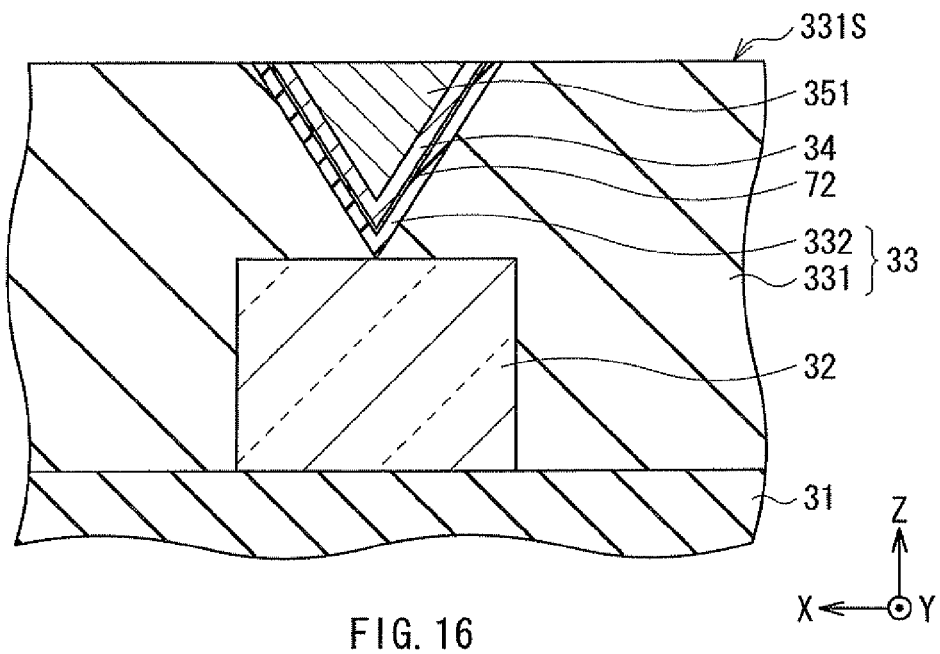
FIG. 16 is a cross sectional view for illustrating a process subsequent to the process of FIG. 15.

Next, as shown in FIG. 16, the process of polishing is performed by chemical mechanical polishing (CMP) or others until the etching mask 71 is exposed, thereby partially removing the magnetic layer 351P, the metallic film 34P, the close-contact film 72, and the dielectric layer 332 wherever covering the etching mask 71. Thereafter, by ion beam etching or others, the process of etching is thoroughly performed until an upper surface 331S of the dielectric layer 331 is exposed. This resultantly leaves the magnetic layer 351P, the metallic film 34P, the close-contact film 72, and the dielectric layer 332 only inside of the groove 331G. Thus remaining dielectric layer 332 serves as the buffer portion 33A, and configures the clad layer 33 together with the dielectric layer 331. Moreover, the metallic film 34P serves as the plasmon generator 34, and the magnetic layer 351P serves as the first layer 351 of the magnetic pole 35.

Figure 17:
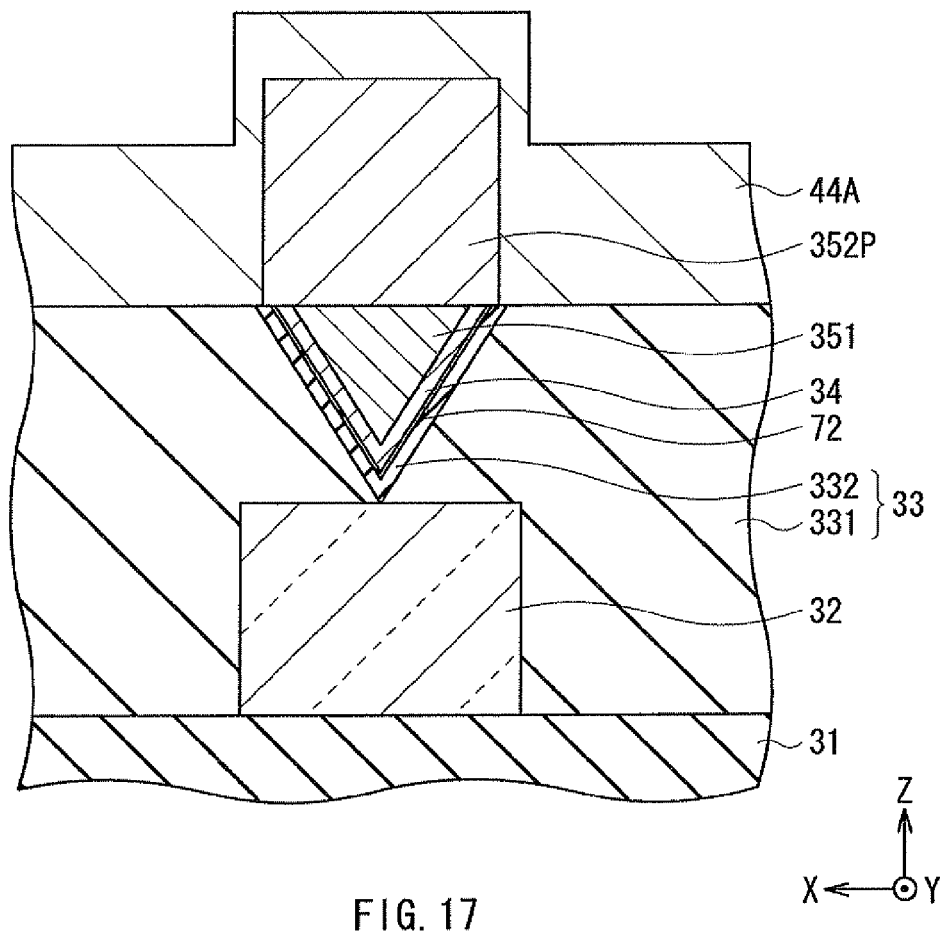
FIG. 17 is a cross sectional view for illustrating a process subsequent to the process of FIG. 16.
Figure 18:
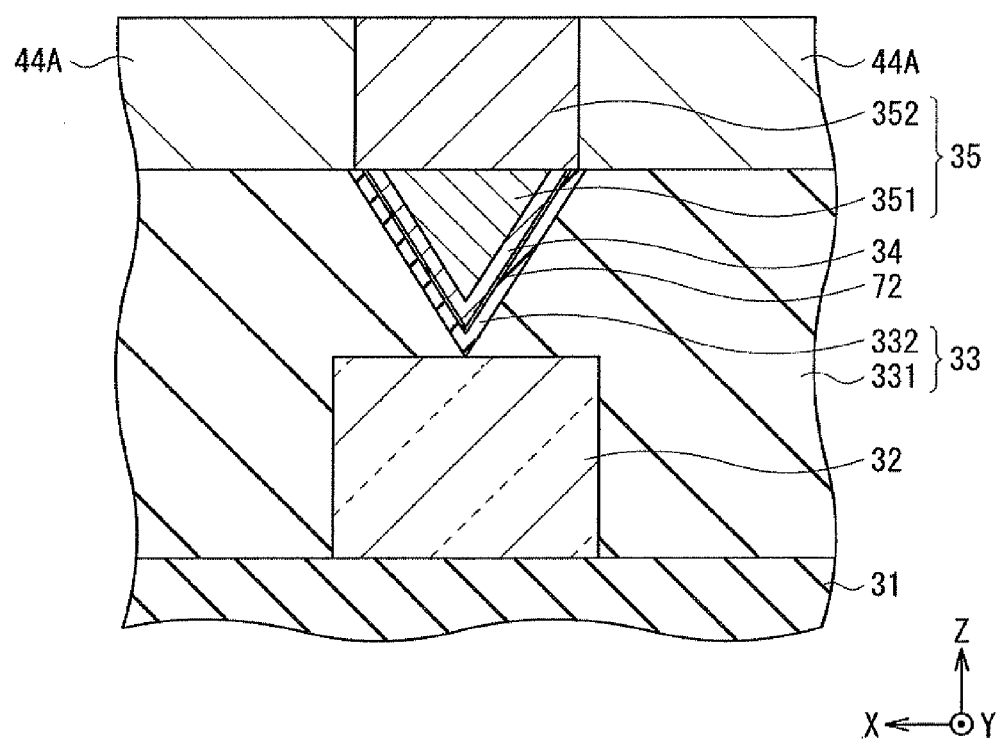
FIG. 18 is a cross sectional view for illustrating a process subsequent to the process of FIG. 17.
Figure 19:
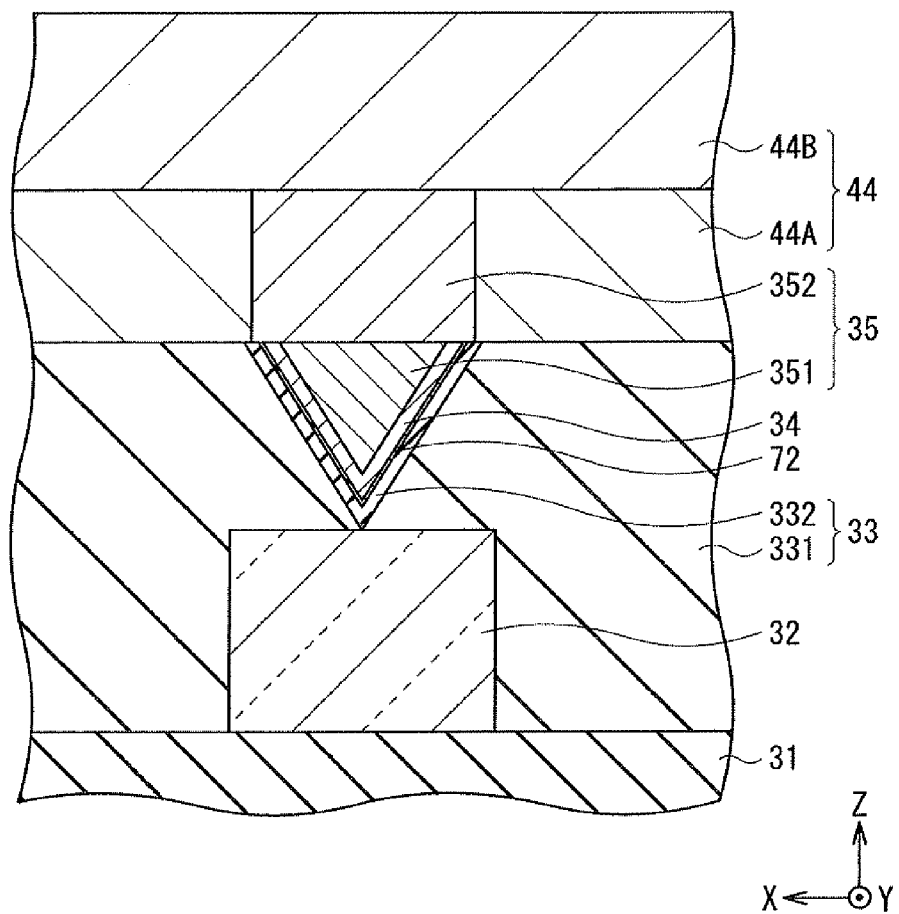
FIG. 19 is a cross sectional view for illustrating a process subsequent to the process of FIG. 18.

Thereafter, as shown in FIG. 17, by plating or others, the first layer 351 is formed thereon with a magnetic layer 352P that serves later as the second layer 352 of the magnetic pole 35. Moreover, in such a manner as to cover entirely the structure, a highly thermally conductive material layer 44A serving later as a part of the heat sink 44 is formed, and thereafter, the resulting structure is subjected to polishing in its entirety by the CMP, for example. In this manner, as shown in FIG. 18, formed is the second layer 352 whose side surface is in contact with the highly thermally conductive material layer 44A, thereby completing the magnetic pole 35. Moreover, by forming a highly thermally conductive material layer 44B in such a manner as to cover the highly thermally conductive material layer 44A and the second layer 352 as shown in FIG. 19, the heat sink 44 configured by the highly thermally conductive material layers 44A and 44B is completely manufactured.

Figure 20:
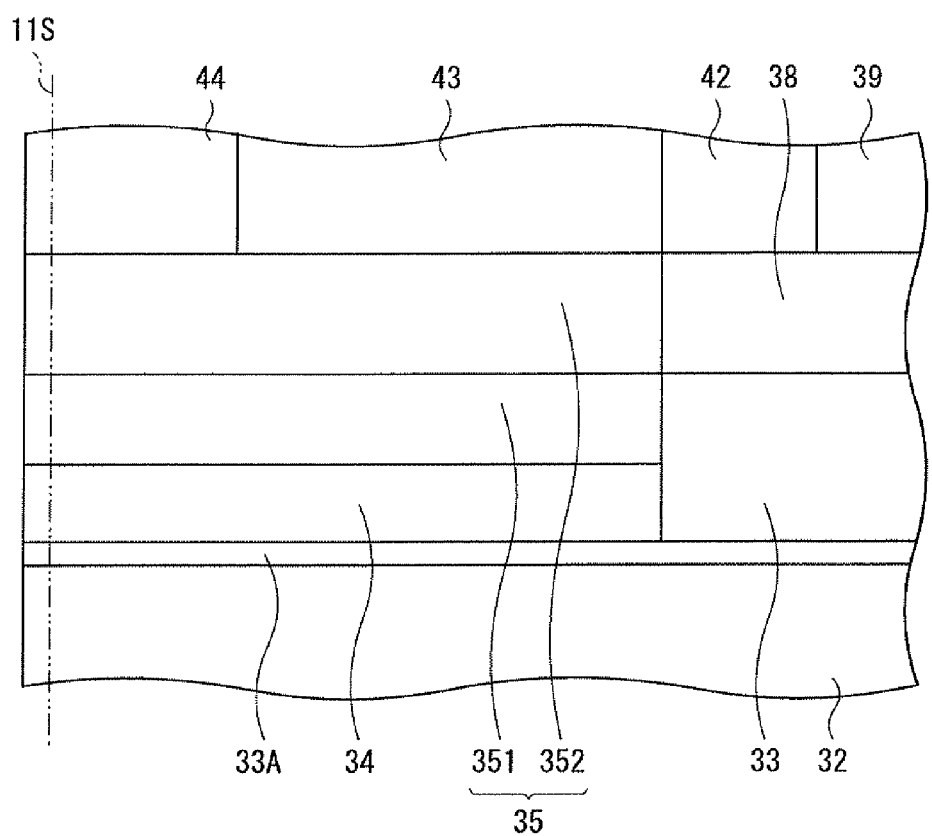
FIG. 20 is a cross sectional view for illustrating a process subsequent to the process of FIG. 19.

Thereafter, after the completion of the laminate structure by forming the protection film 17 on the write head section 16, the ABS 11S and the protection layer 80 are formed as below. First of all, as shown in FIG. 20, by a first polishing process utilizing the CMP or others, the laminate structure is made flat on its end surfaces. At this time, the amount of polishing is calculated by a supply of a predetermined level of current for measurement use to the wrapping guide pattern that is formed in advance on the wafer together with the laminate structure, and by measuring successively any change of resistance thereof. Based on the calculated amount of polishing, the first polishing process is stopped at a position before the target position where the ABS 11S is to be formed (e.g., a position before the target position by 0.01 μm).

Figure 21:
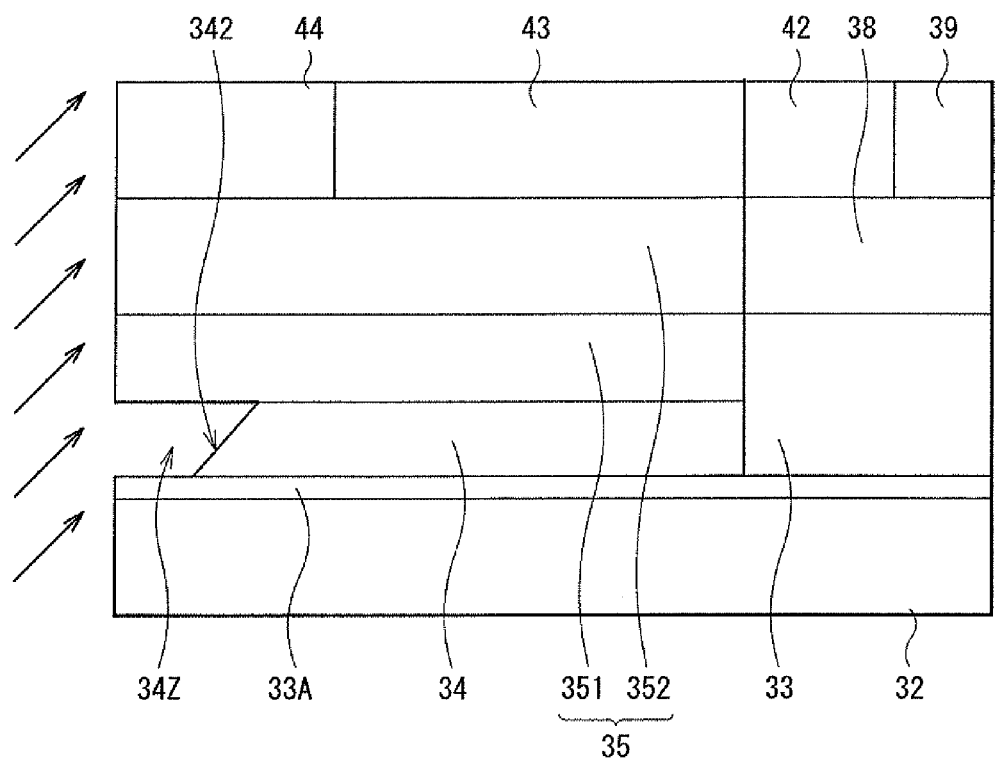
FIG. 21 is a cross sectional view for illustrating a process subsequent to the process of FIG. 20.

Next, as shown in FIG. 21, the process of etching such as ion beam etching is performed. This accordingly removes any impurities (so-called smear) attached to the end surface of the laminate structure as a result of the first polishing process described above. At the same time, the end surface 342 of the plasmon generator 34 is moved to be in the rear of the end surface 3213 of the waveguide 32 and the end surface 35T of the magnetic pole 35, thereby forming a concave portion 34Z to the end surface of the laminate structure. At this time, by performing the process of etching to the end surface of the laminate structure in the diagonal direction, the end surface 342 may be formed with a tilting in the lamination direction (Z-axis direction).

Figure 22:
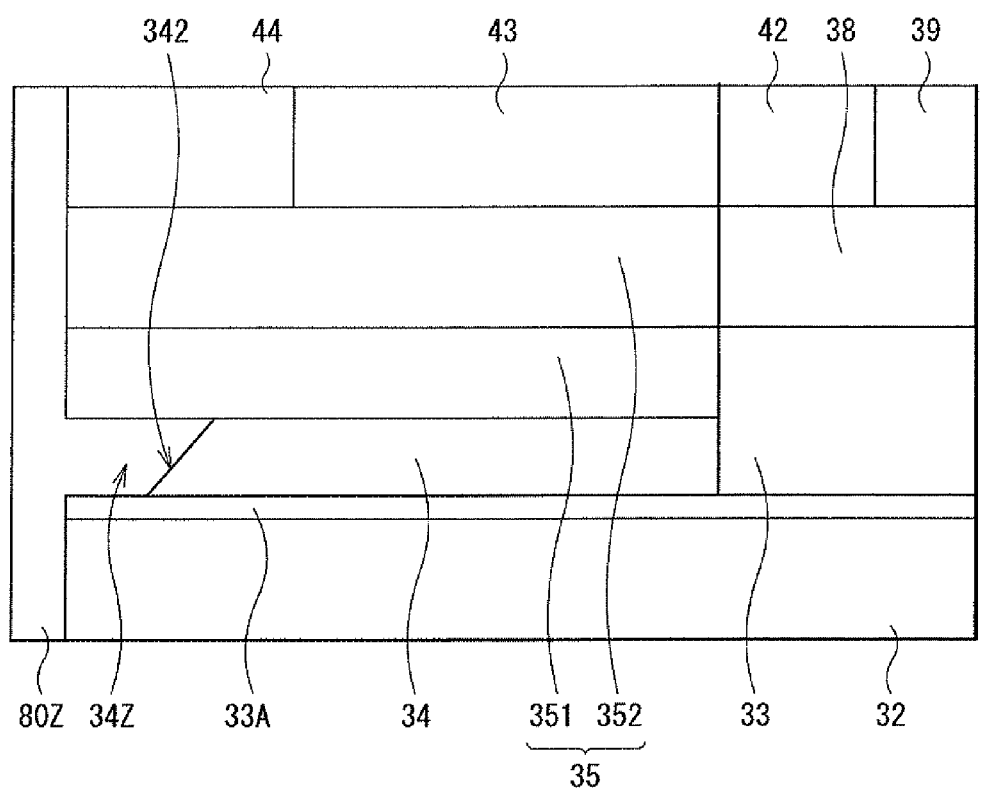
FIG. 22 is a cross sectional view for illustrating a process subsequent to the process of FIG. 21.

Next, as shown in FIG. 22, a protection layer 80Z is formed to the end surface of the laminate structure in such a manner as to fill at least the concave portion 34Z. Thereafter, with respect to the end surface of the laminate structure formed with the protection layer 80Z, a second polishing process utilizing the CMP or others is started, and at the point in time when the magnetic pole 35 is exposed (before the plasmon generator 34 is exposed), the second polishing process is stopped so that the ABS 11S is formed. As a result, the protection layer 80 is also formed. Note that when the protection layer 80Z is made of a conductive material, during the polishing only of the protection layer 80Z, the current for measurement use for a supply to the wrapping guide pattern is directed to the protection layer 80Z (causes a short circuit) via a polishing pad, and thus the resistance value becomes considerably low. When the protection layer 80Z other than the portion serving eventually as the protection layer 80 is removed almost completely, it means that the resistance value of the wrapping guide pattern is to be measured, thereby being able to find the right timing to stop the second polishing process. Lastly, when needed, the process of etching such as ion beam etching is performed to remove any impurities (so-called smear) attached to the end surface of the laminate structure as a result of the second polishing process described above. Note here that the depth to be reached for removal by the process of etching is about 0.001 μm. In this manner, the magnetic write/read head 10 is completely manufactured.

(Control Circuit of Magnetic Disk Device)

Figure 23:
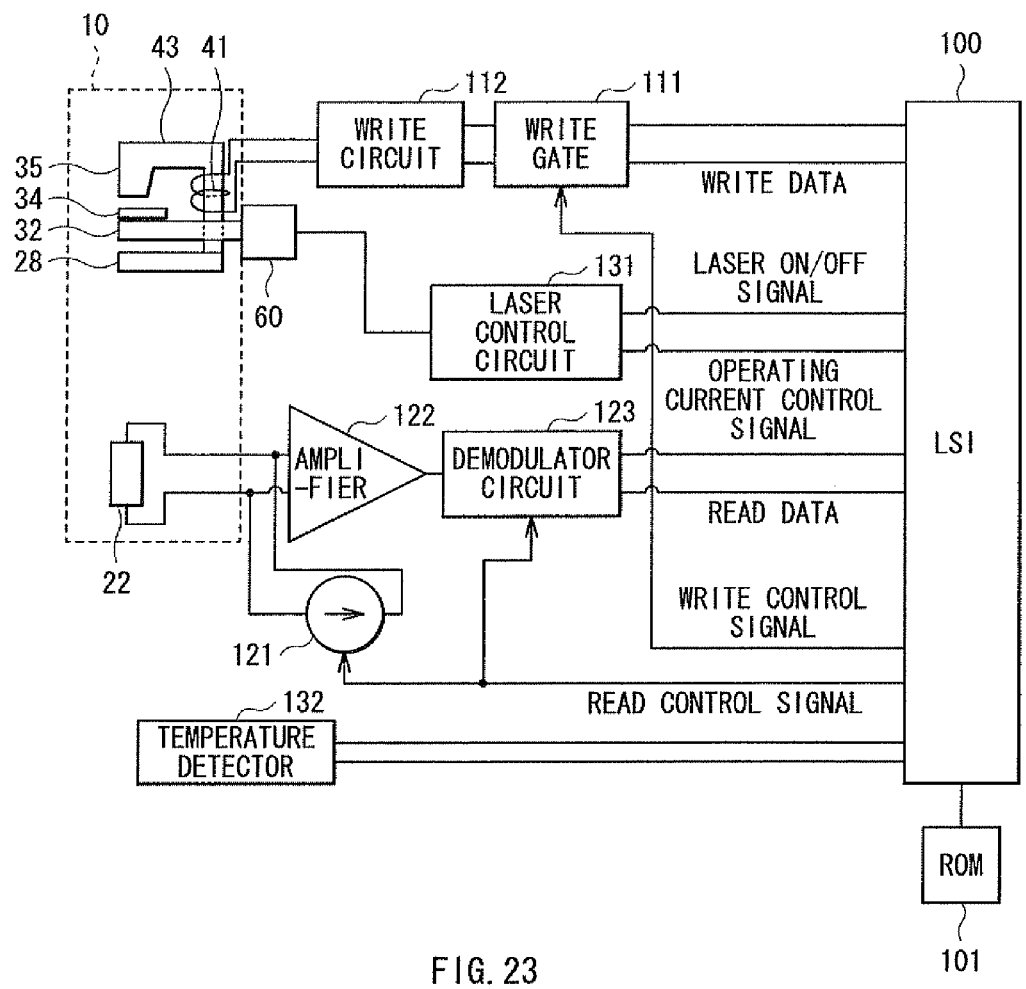
FIG. 23 is a block diagram showing the circuit configuration of the magnetic disk device of FIG. 1.

Next, by referring to FIG. 23, described are the circuit configuration of a control circuit in the magnetic disk device of FIG. 1, and the operation of the magnetic write/read head 10. This control circuit is configured to include a control LSI (large-scale integrated circuit) 100, a ROM (read only memory) 101 connected to the control LSI 100, a write gate 111 connected to the control LSI 100, and a write circuit 112 serving as a link between the write gate 111 and the coil 41. This control circuit is configured to include also a constant current circuit 121 connected to the MR element 22 and to the control LSI 100, an amplifier 122 connected to the MR element 22, and a demodulator circuit 123 connected to an output end of the amplifier 122 and to the control LSI 100. Such a control circuit is configured to include also a laser control circuit 131 connected to the laser diode 60 and to the control LSI 100, and a temperature detector 132 connected to the control LSI 100.

In this example, the control LSI 100 provides the write gate 111 with a write control signal together with write data. Moreover, the control LSI 100 provides a read control signal to the constant current circuit 121 and to the demodulator circuit 123, and receives read data coming from the demodulator circuit 123. Moreover, the control LSI 100 provides the laser control circuit 131 with a laser ON/OFF signal and an operating current control signal.

The temperature detector 132 detects the temperature of a magnetic recording layer of the magnetic disk 2, and transmits information about this temperature to the control LSI 100.

The ROM 101 stores therein a control table or others for control over the value of an operation current for a supply to the laser diode 60.

During the recording operation, the control LSI 100 supplies the write data to the write gate 111. The write gate 111 supplies the write data to the write circuit 112 only when the write control signal is asking the recording operation. The write circuit 112 directs the flow of a recording current to the coil 41 in accordance with this write data. In response thereto, a recording magnetic field is generated by the magnetic pole 35, and by this recording magnetic field, the magnetic recording layer of the magnetic disk 2 is recorded with the data.

During the read operation, the constant current circuit 121 makes a supply of a predetermined sense current to the MR element 22 only when the read control signal is asking the read operation. The output voltage of the MR element 22 is amplified by the amplifier 122, and is input to the demodulator circuit 123. When the read control signal is asking the read operation, the demodulator circuit 123 creates read data by demodulating the output of the amplifier 122, and provides the resulting data to the control LSI 100.

The laser control circuit 131 controls the supply of an operation current with respect to the laser diode 60 based on the laser ON/OFF signal, and controls the value of the operation current to be provided to the laser diode 60 based on the operating current control signal. When the laser ON/OFF signal is asking the ON operation, under the control by the laser control circuit 131, the operation current of an oscillation threshold value or larger is provided to the laser diode 60. In response thereto, a laser light comes from the laser diode 60, and this laser light goes over the waveguide 32. Thereafter, a near-field light NF (will be referred to later) is generated by the tip end portion 34G of the plasmon generator 34, and by this near-field light NF, the magnetic recording layer of the magnetic disk 2 is partially heated so that the coercive force of the part is reduced. During recording, to the part of the magnetic recording layer reduced in coercive force as such, the recording magnetic field generated by the magnetic pole 35 is applied so that recording of data is accordingly performed.

Based on the temperature or others of the magnetic recording layer of the magnetic disk 2 measured by the temperature detector 132, the control LSI 100 refers to the control table stored in the ROM 101 to determine the value of the operation current for provision to the laser diode 60, and then controls the laser control circuit 131 by the operating current control signal to provide the operation current of the value to the laser diode 60. The control table includes the oscillation threshold value of the laser diode 60, and data representing the temperature dependence of the light output—operation current characteristics. The control table may also include data representing the relationship between the value of the operation current and the temperature increase observed in the magnetic recording layer heated by the near-field light NF, or data representing the temperature dependence of the coercive force of the magnetic recording layer.

The control circuit shown in FIG. 23 includes, irrespective of the control signal system for the write/read operation, the signal system for controlling the laser diode 60, that is, the signal system of a laser ON/OFF signal and an operating current control signal, thereby being able to realize not only the current-carrying mode to the laser diode 60 simply associated with the recording operation but also the current-carrying mode to the laser diode 60 varying in type. Note here that the configuration of the control circuit in the magnetic disk device is not restrictive to the one shown in FIG. 23.

Figure 24:
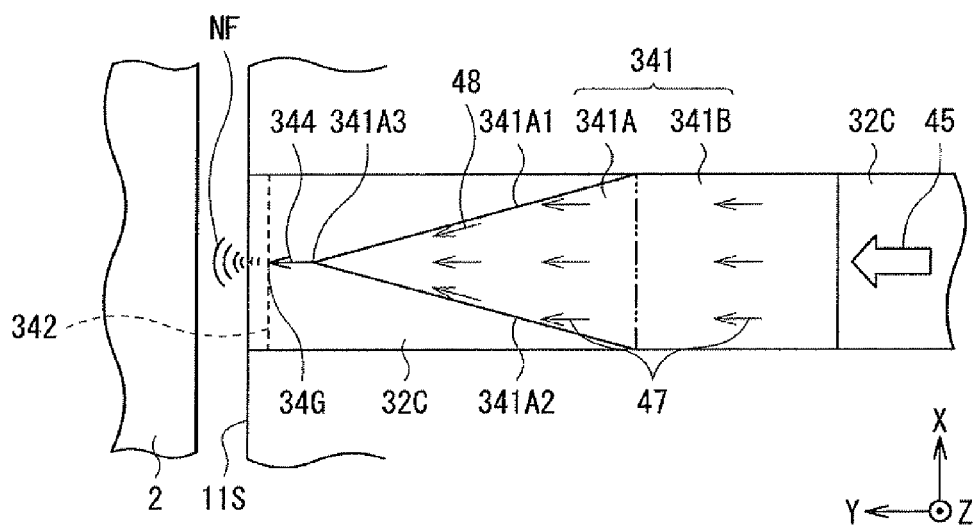
FIG. 24 is an illustration diagram for illustrating the operation of the magnetic write/read head.

Next, by referring to FIGS. 9 and 24, described are the principles of generation of a near-field light in this embodiment, and the principles of thermally-assisted magnetic writing using the near-field light. Similarly to FIG. 10, FIG. 24 is a plan view showing the positional relationship between the surface plasmon excitation surface 341 and the evanescent light generation surface 32C, showing the state of the plasmon generator 34 and that of the waveguide 32 viewed from the side of the magnetic pole 35.

A laser light 45 emitted by the laser diode 60 goes over the waveguide 32, and reaches the area in the vicinity of the plasmon generator 34. Herein, by the laser light 45 being entirely reflected on the evanescent light generation surface 32C being an interface between the waveguide 32 and the buffer portion 33A, an evanescent light 46 (FIG. 9) leaked into the buffer portion 33A is generated. Thereafter, by a combination between this evanescent light 46 and fluctuations of an electrical charge on the surface plasmon excitation surface 341 being a part of the outer surface of the plasmon generator 34, the surface plasmon polariton mode is induced so that a surface plasmon 47 (FIG. 24) is excited on the surface plasmon excitation surface 341. The surface plasmon 47 goes over the surface plasmon excitation surface 341 toward the tip end portion 34G. As already described, the first surface 341A of the surface plasmon excitation surface 341 is so configured that the width thereof in the X-axis direction is reduced as is moved closer to the ABS 11S. Therefore, the surface plasmon 47 is converted by degrees to an edge plasmon 48 (FIG. 24) being a surface plasmon going along the end edges 341A1 and 341A2 while it goes over the first surface 341A, and the plasmon including the surface plasmon 47 and the edge plasmon 48 is increased in intensity of electrical field. The surface plasmon 47 and the edge plasmon 48 are converted into an edge plasmon 49 (FIG. 20) when reaching the edge 344, and then goes along the edge 344 toward the ABS 11S. The edge plasmon 49 eventually reaches the tip end portion 34G. As a result, at the tip end portion 34G, the edge plasmon 49 gathers, and a near-field light NF is generated from the tip end portion 34G based on this edge plasmon 49. This near-field light NF is directed toward the magnetic disk 2, and reaches the surface of the magnetic disk 2, thereby heating a part of the magnetic recording layer of the magnetic disk 2. As a result, the magnetic recording layer heated as such is partially reduced in coercive force. With the thermally-assisted magnetic writing, with respect to the part of the magnetic recording layer reduced in coercive force as such, the recording magnetic field generated by the magnetic pole 35 is applied so that the recording of magnetic information is accordingly performed.

Herein, in the plasmon generator 34, a near-field light NF is generated by excitation due to irradiation of the laser light 45, and the energy in the laser light 45 is partially converted into thermal energy and then is absorbed. As a result, the plasmon generator 34 is increased in temperature. Therefore, the magnetic pole 35 being in contact with the plasmon generator 34 becomes the target for reception of the thermal energy from the plasmon generator 34. However, because the magnetic pole 35 is being in contact with the heat sink 44 having the higher thermal conductivity, most of the thermal energy from the plasmon generator 34 is directed to the heat sink 44 after swiftly passing through the magnetic pole 35, and then is discharged to the outside.

The reason why the electric field of the plasmon is increased in intensity on the first surface 341A is due to the first and second principles as below. First of all, a description is given about the first principles. In this embodiment, first of all, in the surface plasmon excitation surface 341, the surface plasmon 47 is excited on the metallic surface by the evanescent light 46 generated by the evanescent light generation surface 32C. This surface plasmon 47 goes over the surface plasmon excitation surface 341 toward the tip end portion 34G. The wave number of the surface plasmon 47 going over the first surface 341A is increased by degrees as the first surface 341A is increased in width in the X-axis direction, that is, as is moved closer to the ABS 11S. As the surface Plasmon 47 is increased in wave number as such, the surface plasmon 47 is reduced in speed of moving. As a result, the surface plasmon 47 is increased in energy density, and this is considered as the reason why the surface plasmon 47 is increased in intensity of electrical field.

Next, a description is given about the second principles. When the surface plasmon 47 goes over the surface plasmon excitation surface 341 toward the tip end portion 34G, a part of the surface plasmon 47 collides with the end edges 341A1 and 341A2 of the first surface 341A, and thus is dispersed so that a plurality of plasmons varying in wave number are generated. The resulting plasmons generated as such are partially converted into the edge plasmon 48 that is larger in wave number compared with the surface plasmon going over the plane. As such, the surface plasmon 47 is converted by degrees into the edge plasmon 48 that goes along the end edges 341A1 and 341A2, and the resulting edge plasmon 48 is increased by degrees in intensity of electrical field. Moreover, compared with the surface plasmon going over the plane, the edge plasmon 48 is larger in wave number, and is slower in speed of moving. Therefore, by the surface plasmon 47 being converted into the edge plasmon 48 as above, the resulting plasmon is increased in energy density. Moreover, on the first surface 341A, the surface plasmon 47 is converted into the edge plasmon 48 as described above, and the surface plasmon 47 is newly generated based on the evanescent light 46 generated from the evanescent light generation surface 32C. This newly generated surface plasmon 47 is also converted into the edge plasmon 48. As a result, the edge plasmon 48 is increased in intensity of electrical field. The edge plasmon 48 is converted into the edge plasmon 49 going over the edge 344. In this manner, compared with the surface plasmon 47 at the early stage of generation, the resulting edge plasmon 49 has the electrical field being increased in intensity.

In this embodiment, in the first surface 341A, the surface plasmon 47 going over the plane exists together with the edge plasmon 48 larger in wave number than that of this surface plasmon 47. On the first surface 341A, due to the first and second principles described above, the surface plasmon 47 and the edge plasmon 48 are expected to be both increased in intensity of electrical field. Therefore, in this embodiment, compared with the case only with either the first principles or the second principles described above, the plasmon may be increased in intensity of electrical field to a further degree.

(Effects of Magnetic Disk Device)

As such, according to the embodiment, the protection layer 80 is provided in front of the plasmon generator 34, thereby being able to protect the plasmon generator 34 from any possible damage due to physical impact or from any possible corrosion due to moisture or others during the manufacturing process or during the operation of the magnetic disk device. Moreover, in the process of forming the ABS 11S, the concave portion 34Z formed when the impurities as a result of the process of polishing are removed is filled by the protection layer 80, thereby being able to increase the degree of flatness of the ABS 11S. Therefore, during the recording operation, the near-field light NF may be with a sufficient level of intensity without fail, and at the same time, the slider may be in the state of being suspended with a better stability. As a result, the resulting recording operation may be implemented with a good efficiency and stability.

Moreover, if the protection layer 80 is made of a soft magnetic material including at least one of Ni, Fe, and Co, the magnetic flux passing through the magnetic pole 35 may be directed to the protection layer 80. As a result, in the ABS 11S, the position of discharging the recording magnetic field may be brought closer to the position where a near-field light NF is generated, thereby being able to perform the recording operation of the magnetic information with a better efficiency. Among such soft magnetic materials, if the protection layer is made of a magnetic material with a high saturation flux density such as FeCo (especially $Fe_{80}Fe_{20}$) or FeCoNi, the effects are enhanced more.

On the other hand, when the protection layer 80 is made of a material with a high covering factor including Cr, W, Ti, Ni, or others (material that may cover uniformly the surface even with a thin coating), or of a material with a high degree of hardness such as $Al_2O_3$, AlN, BN, $SiO_2$, SiC, or DLC, the possible corrosion or physical damage may be prevented with a better reliability.

Moreover, when the protection layer 80 is made of a material including AgNi, AgPd, AuNi, AuCu, and AlNi, for example, a near-field light NF may be prevented from being attenuated when it passes through the protection layer 80 with good measures taken to prevent any possible corrosion or physical damage.

Furthermore, in this embodiment, the end surface 342 in the front of the plasmon generator 34 is tilted against the ABS 11S so that the magnetic flux passing through the magnetic pole 35 may be brought closer to the tip end portion 34G of the plasmon generator 34. Accordingly, in the ABS 11S, the position where the recording magnetic field is generated and the position where a near-field light NF is generated may be brought closer to each other. Moreover, by tilting the end surface 342, the protection layer 80 is prevented from falling off, and at the same time, the near-field light NF reaching the magnetic disk 2 may be with a sufficient level of intensity without fail. With these reasons, the recording operation of the magnetic information may be performed with a better efficiency.

Still further, the magnetic pole 35 is configured to come in contact with the heat sink 44 whose thermal conductivity is higher than that of the clad layer 33 enclosing the waveguide 32 so that, during the thermally-assisted magnetic writing, the magnetic pole 35 is prevented from being heated even if the plasmon generator 34 is increased in temperature. As such, even if the magnetic pole 35 is disposed to be closer to the plasmon generator 34, the magnetic pole 35 generating the recording magnetic field becomes resistant to corrosion. As a result, the long-term reliability is provided without fail, and the recording operation may be implemented with a better efficiency and stability. Especially in this embodiment, as a material configuring the heat sink 44, by using a material whose thermal conductivity is higher than the material configuring the magnetic pole 35, the heat discharging of the magnetic pole 35 may be performed in a more effective way so that the long-term reliability may be increased to a further degree.

As such, while the present invention has been described by referring to the embodiment, the invention is surely not restrictive to the embodiment described above, and numerous other modifications may be devised thereby. As an example, in the embodiment, a read element is exemplified by a CPP-type GMR element. But this is surely not the only option, and a CIP (Current In Plane)—GMR element is also a possibility. If this is the case, there needs to provide an insulation layer between the MR element and the lower shield layer, and between the MR element and the upper shield layer. There also needs to insert a pair of leads to the insulation layer for a supply of a sense current to the MR element. Alternatively, as a read element, a TMR (tunneling magnetoresistance) element having a tunnel junction film is also a possibility.

The correlation between the reference numerals and the configuration components in the embodiment are as below.

1 . . . chassis, 2 . . . magnetic disk, 3 . . . head arm assembly (HAA), 4 . . . head gimbals assembly (HGA), 4A . . . slider, 4B . . . suspension, 5 . . . arm, 6 . . . drive section, 7 . . . fixed axis, 8 . . . bearing, 9 . . . spindle motor, 10 . . . magnetic write/read head, 11 . . . base, 11A . . . element forming surface, 11S . . . air bearing surface (ABS), 13 . . . insulation layer, 14 . . . read head section, 16 . . . write head section, 17 . . . protection film, 21 . . . lower shield layer, 22 . . . MR element, 23 . . . upper shield layer, 24, 25, 27, 38, 39, and 42 . . . insulation layer, 28 . . . lower yoke layer, 29 . . . lower shield layer, 30, 36, and 37 . . . coupling layer, 31 and 33 . . . clad layer, 32 . . . waveguide, 34 . . . plasmon generator, 34A to 34C . . . first to third portions, 34G . . . tip end portion, 341 . . . surface plasmon excitation surface, 344 . . . edge, 35 . . . magnetic pole, 351 . . . first layer, 352 . . . second layer, 40A and 40B . . . coupling portion, 41 . . . coil, 43 . . . upper yoke layer, 44 . . . heat sink, 45 . . . laser light, 46 . . . evanescent light, 47 . . . surface plasmon, 48 and 49 . . . edge plasmon, 50 . . . light source unit, 51 . . . support member, 60 . . . laser diode, 61 . . . lower electrode, 62 . . . active layer, 63 . . . upper electrode, 64 ... reflection layer, 65 ... n-type semiconductor layer, 66 ... p-type semiconductor layer, 80 ... protection layer, NF ... near-field light.

What is claimed is:

1. A method of manufacturing a thermally-assisted magnetic write head which has a magnetic pole including an end surface exposed from an air bearing surface, a waveguide extending toward the air bearing surface for transmission of a light, and a plasmon generator provided between the magnetic pole and the waveguide for generating a near-field light from the air bearing surface based on the light transmitted over the waveguide, the method comprises steps of:

forming a laminate structure including the waveguide, the plasmon generator, and the magnetic pole;

performing a first polishing process to planarize an end surface of the laminate structure;

performing a first etching process to remove impurities attached on the end surface of the laminate structure, and to allow the plasmon generator to be recessed from the waveguide and the magnetic pole, thereby forming a recessed region from the end surface of the laminate structure;

forming a protection layer on the end surface of the laminate structure such that at least the recessed region is filled; and starting a second polishing process on the end surface of the laminate structure formed with the protection layer, and stopping the second polishing process before the plasmon generator is exposed, thereby completing the air bearing surface.

2. The method of manufacturing thermally-assisted magnetic write head according to claim 1, wherein
    the second polishing process is followed by a second etching process performed on the air bearing surface.

3. The method of manufacturing thermally-assisted magnetic write head according to claim 1, wherein
    the laminate structure is formed through disposing, on a base, the waveguide, the plasmon generator, and the magnetic pole in this order.

4. The method of manufacturing thermally-assisted magnetic write head according to claim 3, wherein
    the protection layer is made of a magnetic material whose saturation flux density is equal to or higher than that of a material configuring the magnetic pole.

5. The method of manufacturing thermally-assisted magnetic write head according to claim 4, wherein
    the protection layer is made of a soft magnetic material including one or more selected from a group configured of Ni (nickel), Fe (iron), and Co (cobalt).

6. The method of manufacturing thermally-assisted magnetic write head according to claim 3, wherein
    the protection layer is made of a material including one or more selected from a group configured of Ni (nickel), Fe (iron), Co (cobalt), Cr (chromium), Ta (tantalum), Ti (titanium), Ru (ruthenium), W (tungsten), and Mo (molybdenum), or a material including one or more selected from a group configured of $Al_2O_3$ (aluminum oxide), AlN (aluminum nitride), BN (boron nitride), $SiO_2$ (silicon dioxide), SiC (silicon dioxide), DLC (diamond-like carbon), AgNi, AgPd, AuNi, AuCu, and AlNi.

7. The method of manufacturing thermally-assisted magnetic write head according to claim 1, wherein
    an end surface, recessed from the waveguide and the magnetic pole, of the plasmon generator is formed to tilt against the air bearing surface.

* * * * *